(12) United States Patent
Erskine

(10) Patent No.: US 6,351,307 B1
(45) Date of Patent: Feb. 26, 2002

(54) COMBINED DISPERSIVE/INTERFERENCE SPECTROSCOPY FOR PRODUCING A VECTOR SPECTRUM

(75) Inventor: David J. Erskine, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/511,411

(22) Filed: Feb. 23, 2000

Related U.S. Application Data

(60) Provisional application No. 60/121,506, filed on Feb. 23, 1999.

(51) Int. Cl.[7] .................................................. G01B 9/02
(52) U.S. Cl. ......................... 356/351; 356/354; 356/73
(58) Field of Search ............................... 356/451, 454, 356/456, 72, 73, 300, 326, 328; 250/339.07, 339.08

(56) References Cited

U.S. PATENT DOCUMENTS 5,059,027 A  * 10/1991  Roesler et al. ............. 356/451

FOREIGN PATENT DOCUMENTS

| GB | 2317446 | * | 3/1998 |
| WO | WO-96/00887 | * | 1/1996 |

OTHER PUBLICATIONS

Born et al, Principles of Optics, 1980, 333–338.*

* cited by examiner

*Primary Examiner*—Samuel A. Turner
(74) *Attorney, Agent, or Firm*—John P. Wooldridge; Alan H. Thompson

(57) ABSTRACT

A method of measuring the spectral properties of broadband waves that combines interferometry with a wavelength disperser having many spectral channels to produce a fringing spectrum. Spectral mapping, Doppler shifts, metrology of angles, distances and secondary effects such as temperature, pressure, and acceleration which change an interferometer cavity length can be measured accurately by a compact instrument using broadband illumination. Broadband illumination avoids the fringe skip ambiguities of monochromatic waves. The interferometer provides arbitrarily high spectral resolution, simple instrument response, compactness, low cost, high field of view and high efficiency. The inclusion of a disperser increases fringe visibility and signal to noise ratio over an interferometer used alone for broadband waves. The fringing spectrum is represented as a wavelength dependent 2-d vector, which describes the fringe amplitude and phase. Vector mathematics such as generalized dot products rapidly computes average broadband phase shifts to high accuracy. A Moire effect between the interferometer's sinusoidal transmission and the illumination heterodynes high resolution spectral detail to low spectral detail, allowing the use of a low resolution disperser. Multiple parallel interferometer cavities of fixed delay allow the instantaneous mapping of a spectrum, with an instrument more compact for the same spectral resolution than a conventional dispersive spectrometer, and not requiring a scanning delay.

80 Claims, 11 Drawing Sheets

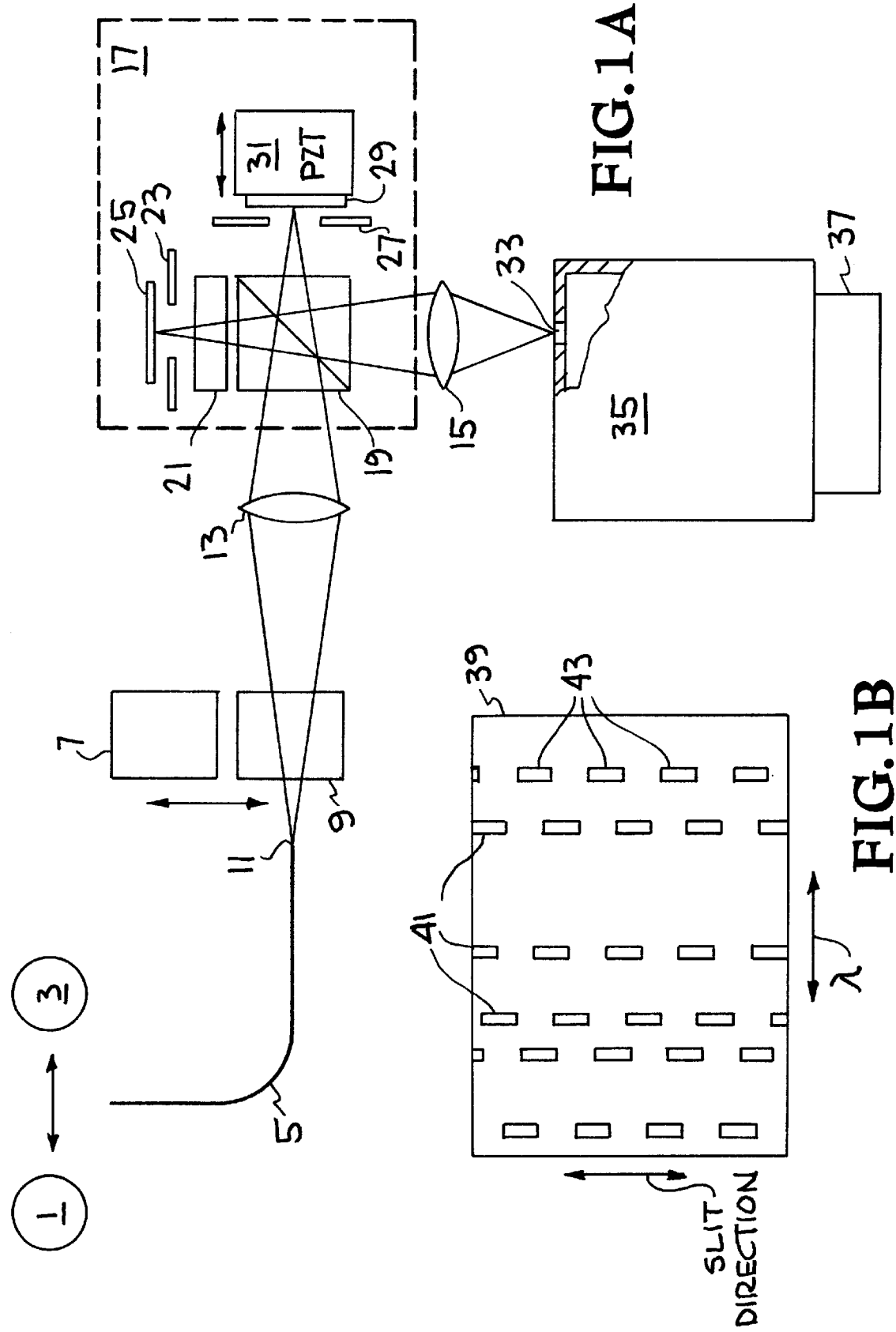

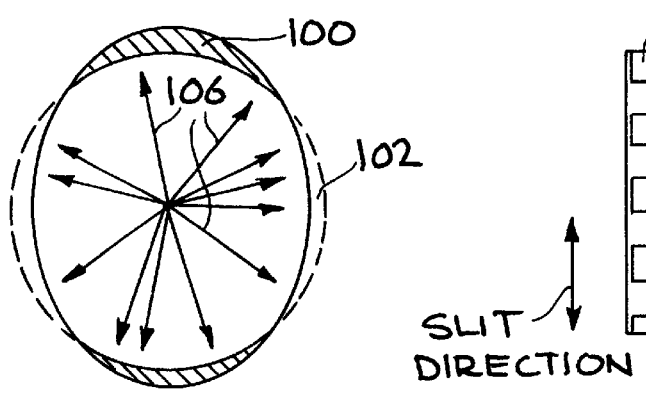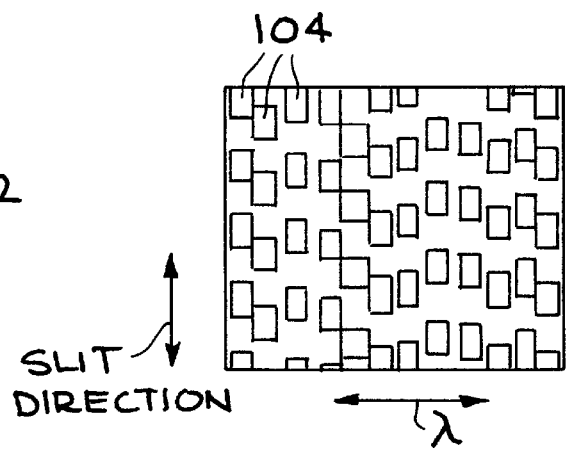
FIG. 6A  FIG. 6B
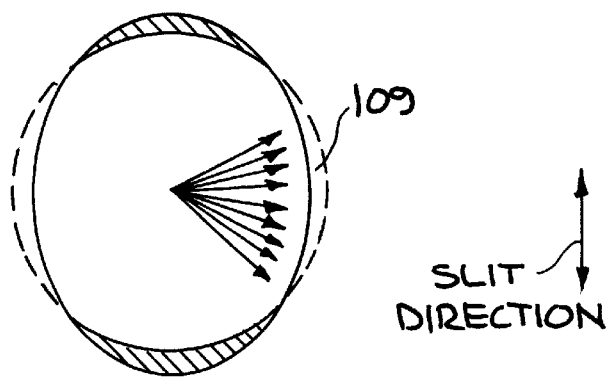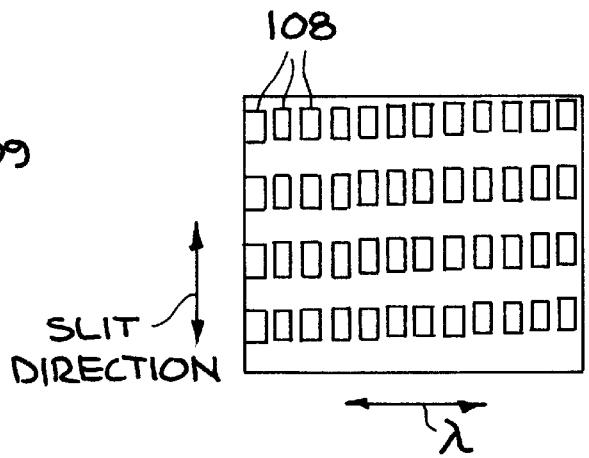
FIG. 6C  FIG. 6D
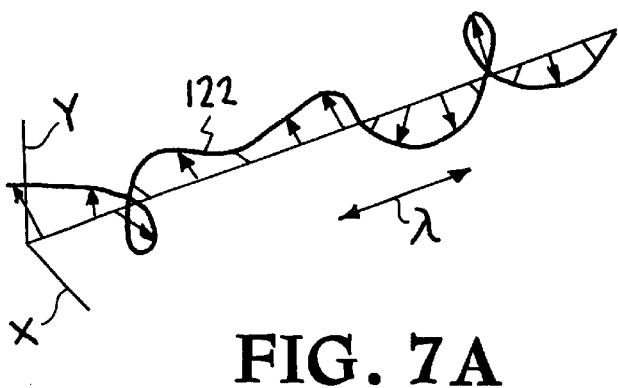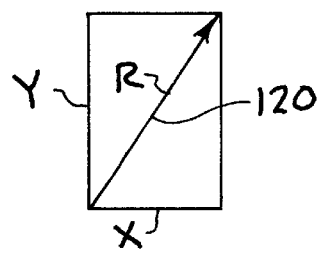
FIG. 7A  FIG. 7B

COMBINED DISPERSIVE/INTERFERENCE SPECTROSCOPY FOR PRODUCING A VECTOR SPECTRUM

This application claims priority to Provisional Patent Application Serial No. 60/121,506, titled "Delay-Free Differential Interferometric Spectrometer" filed Feb. 23, 1999.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to interferometric and dispersive spectroscopy of broadband waves such as light, and more specifically the interferometric measurement of effects which can be made to produce phase shifts such as Doppler velocities, distances and angles, and furthermore the mapping of spectra.

2. Description of Related Art

Spectroscopy is the art of measuring the wavelength or frequency characteristics. There are two complementary forms of spectroscopy method currently used today. In the oldest form, a prism or grating disperses input illumination (let us call it light) into independent channels organized by wavelength or frequency. A spectrum is created which is the intensity versus wavelength channel. This is a scalar versus wavelength channel. In the other method, called Fourier transform spectroscopy, an interferometer having a variable path length difference (called the delay) interferes the illumination with a delayed copy of itself, creating an interferogram. The Fourier transform of this yields the spectrum. Previously, the two methods have not been used together where the interferometry and dispersiveness have had equal emphasis.

An important practical use of spectroscopy is the measurement of Doppler shifts. In addition to many industrial applications of Doppler velocimetry, astronomers measure the Doppler velocity of stars in order to deduce the presence of planets orbiting around the star. The stellar spectrum contains numerous dark absorption lines against a bright continuum background. These spectral lines are randomly distributed about 1 Angstrom apart from each other. A slight change in the average position of these lines is the Doppler effect to be measured. The average width of these stellar lines is about 0.12 Angstroms in the visible, which corresponds to an equivalent Doppler velocity width of about 6000 m/s. Hence, measuring Doppler velocities below 6000 m/s is extremely challenging and requires carefully dividing out the intrinsic behavior of the instrument from the raw data.

A 1 m/s velocity resolution is desired in order to reliably detect the presence of Jupiter and Saturn-like planets, which produce 12 m/s and 3 m/s changes respectively in the stars intrinsic velocity. Current astronomical spectrometers are based on the diffraction grating. These have a best velocity resolution of 3 m/s, but is often 10 m/s in practice. This resolution is insufficient to reliably detect Saturn-like extra-solar planets. This limit is related to the difficulty in controlling or calibrating the point spread function (PSF).

The PSF is the shape of the spectrum for a perfectly monochromatic input. Ideally this is a narrow peak of well-determined shape. Unfortunately, the PSF of actual gratings varies significantly and in a complicated way against many parameters such as temperature, time, and average position in the spectrum. It is a complicated function that requires many mathematical terms to adequately approximate it. This is fundamentally due to the hundreds or thousands of degrees of freedom of the diffraction grating—at least one degree of freedom per groove of the grating. These degrees of freedom must be carefully calibrated, otherwise drifts can cause apparent Doppler velocities much larger than the effect being sought. The calibration process is time consuming.

Another disadvantage of conventional astronomical spectrometers is their large size, which can be several meters in length. Large distances between optical components, which need to be held to optical tolerances, require very heavy and expensive mounts and platforms to prevent flexure. This dramatically increases expense and prevents portability. Practical use aboard spacecraft or aircraft is prevented. The high expense limits the number of spectrometers which can be built to a few, only by well-endowed institutions.

Other disadvantages include a very limited field of view, which is called etendue and is the area of the input beam times its solid angle. This is due to the narrowness of the slit at the instrument entrance that defines the range of entry angles. In a grating or prism based instrument the entry angle and the wavelength, and hence deduced Doppler velocity, are directly linked. The slit needs to be narrow to provide better than 0.05 Angstrom resolution to resolve the stellar spectral lines. Atmospheric turbulence causes the star image to dance around, sometimes off the slit opening. This reduces the effective instrument throughput. Furthermore, changes in intensity profile across the slit have to be carefully deconvolved from the data, since the Doppler velocity gradient across the slit is approximately 3000 m/s. Thus achieving 3 m/s velocity accuracy is extremely difficult with a dispersive spectrometer, and 1 m/s has never been achieved.

An interferometer is attractive for spectroscopy because its angular dependence can be made very small or zero. This allows wider slits, and hence accommodating blurrier star images at high throughput, for the same equivalent spectral resolution. Secondly, its PSF is a sinusoid, which is a simple mathematical function having only 3 degrees of freedom (phase, amplitude and intensity offset). This makes calibration of instrument and processing of data fast, since standard vector mathematics can be used. Secondly, this makes it easy to reject noise not having the expected sinusoidal shape. Furthermore, the spectral resolution can be made almost arbitrarily large simply by increasing the delay (difference in path length between the two interferometer arms). The interferometer is compact and inexpensive, because the optical components need only be a few millimeters or centimeters from each other.

The important difficulty of an interferometer measuring broadband illumination is poor fringe visibility. Fringe phases naturally changes with wavelength. When component fringes of many wavelengths combine on the same detector, they reduce the visibility of the net fringe. For this reason conventional interferometer based instruments such as Fourier transform spectrometers without any wavelength restricting filters are rarely used in low light applications.

A solution to this problem is to combine a wavelength disperser with the interferometer so that fringes of different wavelengths do not fall on the same place on the detector. The combination of disperser and Fabry-Perot interferometer is described in the book "Principles of Optics" by Max Born and Emil Wolf, Pergamon Press, 6th edition, on page 336, section 7.6.4 and their FIGS. 7.63, 7.66 and references therein. Distinctions exist between apparatus described in "Principles of Optics" and the present invention. The Born & Wolf device produces fringes that are narrow and peak-like, not sinusoidal. Consequently, the fringe shape is not described by a 2-element vector. This reduces accuracy when trying to measure small phase shifts. Furthermore, phase stepping is not involved. Thirdly, a heterodyning action is not employed to shift high-resolution spectral details to low spectral resolution.

In some kinds of metrology a secondary effect, such as temperature, pressure or acceleration, is measured by the change it induces in the delay of an interferometer, such as through changing the position of a reflective surface or altering a refractive index. The delay is then sensed by the phase of a fringe. In current devices monochromatic illumination, such as laser illumination, is needed to produce visible fringes from non-zero delays. (The delays are often non-zero for practical reasons, or to have a significant range of travel.) However, the use of monochromatic illumination creates fringe skip ambiguities which make the absolute size of the effect being measured ambiguous. Only small changes can be reliably measured. Broadband light solves the fringe skip problem, but produces insufficient fringe visibility because its coherence length (about 1 micron) is usually very much shorter than the delay.

In a related metrology, fringe shifts can be used to measure angles of distant objects such as stars. Light from the star is collected at two separate places a baseline distance apart, and interfered against each other at a beamsplitter. This is called long baseline interferometry. Effectively, an interferometer is created in the triangle consisting of the target and the two collecting ports. In the case of broadband targets such as starlight, the short coherence length of the illumination (about 1 micron) restricts the interferometer delay to be very near zero in order to produce visible fringes. This restricts the angular range. Secondly, an interferometer's phase is sensitive to the illumination's spectral character on bandwidth scales given by 1/(delay). Having a small or zero delay means the interferometer phase is sensitive to the overall shape of the illumination spectrum, and this can vary erratically due to atmospheric turbulence. More accuracy could result if the interferometer were only sensitive to behavior on short bandwidth scales, such as 1 Angstrom, because this is less affected by the atmosphere. This would require using large delays (several millimeters at least), which can't be done with the present long baseline interferometers.

A related spectroscopic long-baseline interferometer technique is described by Kandpal et. al., in Journal of Modern Optics, vol. 42, p447–454 (1995). Intensity modulations are observed in a spectrometer which are due to the angular separation of two stars. However, this technique does not use heterodyning, nor phase stepping nor slit fringes, nor an iodine cell, nor use vectors to describe the data at each wavelength channel. Because of this, the typical maximum angle it can measure is 8000 times smaller than what my invention can measure.

SUMMARY OF THE INVENTION

It is an object of the invention to measure the spectral characteristics of waves, especially broadband waves. These waves include electromagnetic waves, and any other waves that can be passed through an interferometer where they interfere with a delayed copy of themselves, and can be dispersed into intensity-detecting channels organized by frequency or wavelength. The dispersion can be either before or after the interference. Broadbandedness could be defined as when, with the interferometer were used by itself without the disperser, the phases of the fringes of different spectral regions within the input illumination are more than 90 degrees different from each other, and thereby start to diminish the net fringe visibility.

The invention comprises the series combination of a disperser which organizes the waves by frequency or wavelength, and the interference of the waves with a delayed copy of themselves. It is an object of the invention to create a spectrum which has fringes whose phase and amplitude can be determined for a given wavelength channel independent of information from other wavelength channels. Such a spectrum is called a fringing spectrum. To determine fringe phase and amplitude of a given wavelength channel independent of other channels, the interferometer delay is arranged to vary, either spatially along the slit of the disperser (which is perpendicular to the dispersion axis), or temporally by "phase stepping", which is to take repeated exposures while changing the overall interferometer delay for all channels. When the delay changes along the slit, such as by tilting an interferometer mirror or beamsplitter, fringes are created which cause the intensity profile along the slit to vary sinusoidally with a finite period.

Regardless of any fringing behavior along the slit direction, an interferometer always has sinusoidal behavior versus frequency. This is called the "spectral comb". This comb may not be resolved by the disperser, but its presence is still key in producing Moire fringes.

The effect of passing light through both the interferometer and disperser is to multiply the spectral comb with the illumination spectrum. Together with the presence of blurring along the dispersion axis, a heterodyning effect occurs which creates Moire fringes. These shift high spectral resolution details to low spectral resolution. Hence, a low spectral resolution disperser can be used, even though high spectral resolution information is being sensed. This lower costs, increases throughput and increases field of view compared to a high-resolution disperser used alone.

It is an object of the invention to express the fringing spectrum as a 2-dimensional vector versus wavelength or frequency channel, which is called a vector spectrum. This data format is also called a "whirl". The length and angle of the vector when expressed in polar coordinates represent the fringe amplitude and phase, respectively. The vectors can be computed by evaluating the Fourier sine and cosine amplitudes, for a periodicity near the natural fringe periodicity along the slit axis, and assigning these to the X and Y rectangular coordinates of the vector. In the case of infinite fringe periodicity along the slit, the Fourier components cannot be determined from a single exposure, but can be determined if the several exposures are made while incrementing the interferometer by a small amount, such as equivalent to a quarter wave, and knowing that the fringes will shift in phase proportional to the delay change. This technique is called phase stepping. Phase stepping is recommended even for finite fringe periodicity along the slit, because it assists in distinguishing true fringes from common-mode noise.

The embodiment of the invention having a single approximately fixed interferometer delay can measure broadband phase shifts due to the Doppler effect of a moving source. Due to the action of the disperser, the optimum delay value is approximately half the coherence length ($\lambda^2/\bullet\lambda$) of the illumination that is due to the spectral lines or other narrow features, not the short coherence length due to the continuum background. That is, •λ is given by the 0.12 Angstrom width of the spectral line instead of hundreds of Angstroms of the continuum. In the absence of a disperser the relevant coherence length would be due to the broad continuum background, and therefore thousands of times shorter.

This delay choice provides a good tradeoff between fringe visibility and phase shift per velocity ratio. For starlight this is a delay of about 11 mm.

The Doppler velocity is proportional to the whirl rotation. This can be found by taking the dot product of the input whirl against an earlier measured whirl, and against the earlier measured whirl rotated by 90 degrees. The whirl dot products are generalized dot products evaluated by summing or averaging the channel dot product over all wavelength channels. The dot product is called "generalized" because it sums products over both the spatial and wavelength indices. The subsequent arctangent of the two aforementioned dot products yields the whirl angle. Note that a key advantage implicit in the generalized dot product is that the summation over wavelength channels happens prior to applying the arctangent function. This prevents large discontinuities in the arctangent function that would occur for spectral channels that have zero or small fringe visibility.

Since the whirl rotation is dependent on both the interferometer delay and the illumination spectrum, measuring a Doppler effect requires independently determining the interferometer delay, which could be wandering due to vibration and thermal drift. This can be accomplished by including a reference spectrum with the target illumination, such as by passing the light through an iodine vapor cell which imprints its own absorption lines, which have stable positions unrelated to the Doppler effect. This creates a net whirl which contains two components, corresponding to the target illumination and the reference spectrum. The difference in rotation between the target whirl and the reference whirl components yields the target Doppler velocity. The rotational positions of the target and reference whirl components can be found by expressing the total whirl as a linear combination of component whirls with unknown coefficients, and applying generalized dot products.

The advantage of this invention is an instrument which is much more compact, lower cost, and having a greater field of view than a conventional dispersive spectrometer of 0.05 Angstrom, and has much greater signal to noise ratio than an interferometer used alone.

Another embodiment of the invention uses the interferometer delay as a means of measuring secondary effects such as temperature, pressure and acceleration. These effects are arranged to change the delay in a known manner, such as by moving a reflective part of the interferometer cavity or altering the refractive index of the cavity medium. A steady reference spectrum is used for the illumination. Then changes in the whirl rotation can be ascribed to changes in the interferometer delay and hence the secondary effect. Since the interferometer delay may already be changing due to deliberate phase stepping, it is advantageous to include a second interferometer in series with the probe interferometer cavity to act as a reference cavity. Then the change of one interferometer delay compared to the other provides the measurement of the secondary effect being probed. This method differs from conventional interferometric measurements of cavity lengths by the use of broadband instead of monochromatic illumination. This allows a unique determination of the absolute cavity length without the fringe-skip ambiguity of monochromatic waves.

A variation of this method can measure the angular position of distant objects such as stars if the interferometer cavity is replaced by a long baseline interferometer, which collects starlight at two separate places a baseline apart from each other and interferes them. Effectively, the triangle consisting of the star and the two collection ports forms the interferometer cavity. Changes in star angle cause an arrival time difference in the starlight interfering with itself. This creates a rotation of the whirl which is measured. The target light can be passed through an iodine vapor absorption cell to imprint a known spectrum. This way, the star's velocity will not affect the measurement because the stellar spectrum can be ignored, and targets having no intrinsic spectral lines or narrow features can be used. Furthermore, greater angular separations can be measured because the iodine linewidths are much narrower (by a factor 8) than stellar linewidths, so proportionately greater arrival time differences at the beamsplitter can be measured. By observing two or three stars simultaneously through the use of beamsplitters at the collection ports, poorly known instrumental parameters such as the baseline length and the phase stepping amount can be determined from the data. The advantage of using this technique is that more precise phase shifts can be measured than in conventional long baseline interferometry, over larger angular range, because the imprinted iodine spectrum is much more information rich than the star's intrinsic spectrum.

Furthermore, the 2-d vector format of the whirl preserves the polarity of the Moire fringes, which preserves polarity of arrival time difference and hence the target angle relative to the baseline. This is not possible with devices that only record the intensity (scalar) spectrum.

Measuring a Doppler shift of a spectrum is a different task than mapping a spectrum, which is the purpose of many conventional spectrometers. The former task requires only a subset of the full spectral information. An embodiment of the invention which modifies the interferometer to have several parallel channels of different delay striking separate positions of the detector can indeed map a spectrum. Each interferometer delay produces a whirl which is responsible for measuring a particular subset of the full spectral information. The interferometer delays are chosen to be different from each other so that the set of them samples all the desired spectral information. The separate spectral information is combined together mathematically, using the knowledge that the Moire fringes of the fringing spectrum manifest a heterodyning process that beats high spectral detail to low spectral detail. The reverse process is employed to mathematically reconstruct the full spectrum of the input illumination. This process involves Fourier transforming each whirl from frequency-space to delay-space, translating each in delay-space by the specific interferometer delay used, concatenating all these together, then inverse Fourier transforming to yield a net spectrum. The advantage of this invention for mapping a spectrum is that it forms a more compact, lower cost device than dispersive spectrometers for the same equivalent spectral resolution. And compared to conventional Fourier transform spectrometers it can measure single shot events (instantaneous measurement) because it does not require waiting for an interferometer delay to be scanned. The delays are fixed. The lack of significant moving parts is also an advantage for space-based operation.

BRIEF DESCRIPTION OF THE DRAWINGS

FIG. 1A shows an embodiment that measures Doppler shifts of starlight.

FIG. 1B shows a fringing spectrum or 2-dimensional intensity image produced by the embodiment of FIG. 1A FIGS. 2a and 2b show a ladder of fringes overlaying the slit.

FIGS. 6a and 6b show the vector angles and fringing spectrum when the fringe phases are randomly distributed over a large range.

FIGS. 6c and 6d show the vector angles and fringing spectrum when. the fringe phases are too similar.

FIG. 7a shows the whirl as a meandering path traced by a wavelength dependent vector.

FIG. 7b shows the relation between polar and rectangular coordinates.

DETAILED DESCRIPTION OF THE INVENTION

Figure 2A:
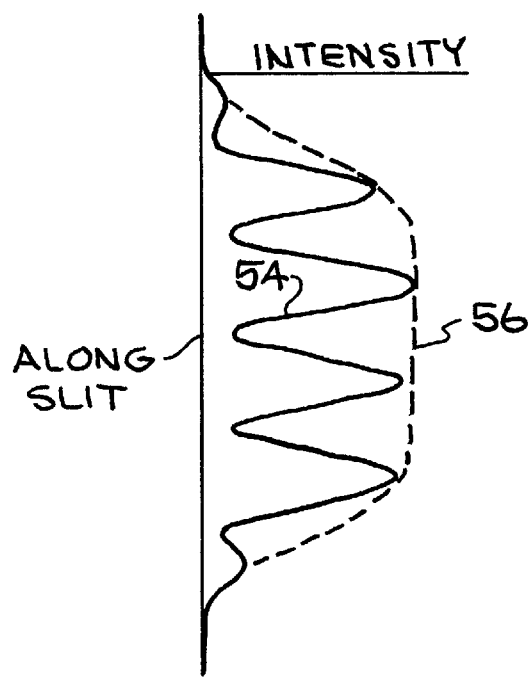
FIGS. 2c and 2d show how the ladder cycles versus fringe phase.

FIG. 1A shows an embodiment of the invention optimized to detect small Doppler shifts from starlight. The series combination of an interferometer 17 and a disperser 35 creates a fringing spectrum 39, shown in FIG. 1B, which is a 2-dimensional intensity image. The dimensions are direction along a slit 33 versus dispersion axis (frequency or wavelength). This image is recorded at the CCD detector 37 or similar 2-dimensional intensity detector. In general the interferometer can either precede or follow the disperser, since the transmission behavior of the net instrument is the product of multiplying the two transmission behaviors of its components. The slit 33 which defines the entrance to the disperser 35 is perpendicular to the dispersion direction, which is in the plane of the paper. When the interferometer precedes the disperser, the disperser should be an imaging disperser, whereby the intensity variations along the slit direction are faithfully imaged to the detector. Otherwise, the apparatus must be operated in mode of infinitely tall fringe period, which relies on phase-stepping to determine fringe phase and amplitude. If the disperser precedes the interferometer, then it is not necessary for the disperser to preserve the image along the slit.

The choices of the source of light may include a target 1, or a lamp 3 having a broad featureless spectrum (such as an incandescent lamp). The light can conveniently be conducted to the apparatus via a fiber 5. The lamp is needed during calibration procedures that measure the iodine cell 7 spectrum by itself, or the interferometer by itself.

The iodine vapor cell 7 is used to imprint a reference spectrum on the input illumination so that unavoidable changes in interferometer delay such as due to thermal drift, air pressure changes, mechanical vibrations and uncertainties in the PZT transducer can be distinguished from legitimate changes in fringe phase due to the Doppler effect. These delay drifts can easily exceed the desired instrument phase accuracy by many orders of magnitude. For example, measuring a 1 m/s Doppler shift with an 11 mm delay corresponds to a phase change of $1/14000$th of a wave of green light.

The spectral reference should have many narrow and stable spectral lines distributed evenly over the spectrum. The spectral reference can be absorptive, such as iodine or bromine molecular vapors, or emissive such as a thorium lamp. An iodine vapor cell heated to 40 to 50 C temperature is a common spectral reference used for green light. Since absorption is a multiplicative effect, the cell can be placed anywhere upstream of the detector. An identical but empty dummy cell 9 can be swapped with the iodine cell 7 to reduce the change in beam profile due to the glass windows. If a reference emission lamp is used, its light should join the target light prior to the interferometer and disperser, and be superimposed in path such as by use of a beamsplitting surface.

An optical system represented by lenses 13 and 15 images the light from the fiber end 11 through the interferometer and to the disperser slit 33. Other lenses such as field lenses are not shown but can be included to help relay the beam and control the pupil from expanding too large. These field lenses could image the pupil at lens 13 to the pupil at lens 15, for example. For maximum throughput the lens magnifications are chosen so that the size and numerical aperture of the light leaving the fiber is matched to the slit width and accepting numerical aperture of the disperser. It is useful to first image the fiber end 11 to a real image near the interferometer mirror 29 and 25, then to relay this to another real image at the slit. This minimizes the area of the beamsplitter which needs to be optically flat.

It is optimal to make several fringe periods span along the slit length, so that fringe phase and amplitude can be determined for each wavelength channel independent of others in a single exposure. This requires illuminating a length of the slit. To avoid wasting light, the beam cross-section at the slit should be rectangular with a high aspect ratio so that it is not unnecessarily wider than the slit. The beam should also be rectangular at the interferometer mirrors 25, 29 so that a fringe ladder 52 and 54 (FIGS. 2a and 2b) can be imprinted on it. In applications where efficiency is not important, it is sufficient to use round beam cross-sections.

There are several methods of creating a rectangular beam cross-section. One method is to use cylindrical optics. The optical system represented by lens 13 between the fiber 5 and interferometer 17 could be astigmatic so that for the plane out of the paper the light would not focus at the mirrors 25, 29 but instead have a large extent. In the plane of the paper it would form a narrow focus at the mirrors 25, 29. Another method is to use a fiber bundle to change a round cross-section to a rectangular cross-section at position 11. Then the optical system represented by lens 13 could be ordinary (not astigmatic). A third method is to use various "image slicing" techniques developed by astronomers using mirrors etc. to dissect a round beam cross-section and reassemble it in a different order to form a rectangle at position 11. If the disperser precedes the interferometer, then the beam entering the disperser could be small and round. The disperser could make a spectrum which could have finite vertical height (the dispersion direction assumed horizontal), possibly using either non-imaging paths inside the disperser or using cylindrical optics after the disperser and before the interferometer.

The interferometer 17 is responsible for creating a sinusoidal-like frequency dependence to the transmitted intensity. These fringes in frequency space are called "spectral comb" fringes, shown as 67, 69 in FIGS. 3a and 3b. In addition, it is optimal to have spatial fringes 65 along the slit direction, so that without phase stepping the fringe phase and amplitude can be determined for a given wavelength channel. That way the inclusion of phase stepping results in even better accuracy because then there are redundant methods of determining fringe phase and amplitude.

A variety of interferometer types can be used, with the desirable properties being high throughput, and the creation of fringes with a large sinusoidal component. A Michelson type interferometer, as opposed to a high-finesse Fabry-Perot type, creates the most sinusoidal fringes. The optical path length difference between the interferometer arms is called the "delay", which is usually in length units. The symbol $\tau$ represents the delay in time units, $\tau=(delay)/c$, where c is the speed of light. A Michelson with a non-zero delay will produce a sinusoidal transmitted intensity component of the form $\sin(2 \cdot f\tau)$ or $\sin(2 \cdot \tau c/\lambda)$. Hence there are three ways that fringes can be made: 1) Versus wavelength or frequency; these produce spectral comb fringes which create the heterodyning effect through the Moire fringes. These may or may not be resolved at the detector depending on the disperser resolution, which is affected by its slit width. The invention does not need them to be resolved, but resolving them can improve signal to noise. 2) Versus position along the slit. These are called "slit fringes" and exist when $\tau$ varies linearly along the slit, such as when an internal interferometer mirror 25, or 29 or beamsplitter 19 is tilted. These fringes are not required but are helpful. 3) Versus phase stepping. This is where $\tau$ is increment the same amount everywhere along the slit, such as by moving mirror 29 by a PZT transducer 31. These are required to determine fringe phase and amplitude if there are no slit fringes. However, even when slit fringes exist phase stepping is useful for improving accuracy, especially to distinguish common-mode errors.

For the embodiment of FIG. 1 that measures Doppler shift, the interferometer delay is approximately fixed (within a few waves), because that is simple, and sufficient to determine a Doppler effect by observing a phase shift. This is in contrast with a conventional Fourier Transform spectrometers which scan the delay over a large range (tens of thousands of waves). The optimum fixed delay to use is approximately half the coherence length $(\lambda 2/\cdot\lambda)$ of the spectral lines, where $\cdot\lambda$ is the typical spectral linewidth of about 0.12 Angstrom. Linewidth is the full width at half maximum (FWHM). This coherence length is about 23 mm for starlight at $\lambda=540$ nm. This choice yields a good compromise between Moire fringe visibility and sensitivity of the Moire fringe phase to a given Doppler velocity of target. (Larger delay will give greater phase shift per velocity, but the fringe visibility will drop significantly when it is larger than this coherence length.) For use on sunlight and starlight, in one embodiment, a delay of approximately 11.5 mm was used.

Note that this 23 mm coherence length due to the spectral lines is much larger than the approximately 1 micron coherence length of the continuum portion of the spectrum. The inclusion of a disperser to an interferometer allows this larger coherence length component to be sensed with reasonable fringe visibility.

Figure 3A:
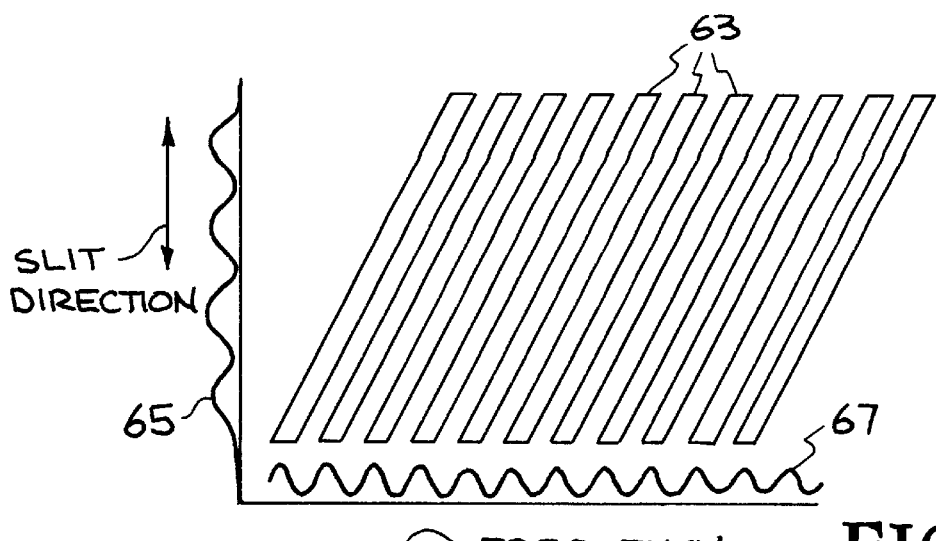
FIG. 3a shows a slanted spectral fringe comb created by interferometer when a ladder of fringes exists along the slit.
Figure 3B:
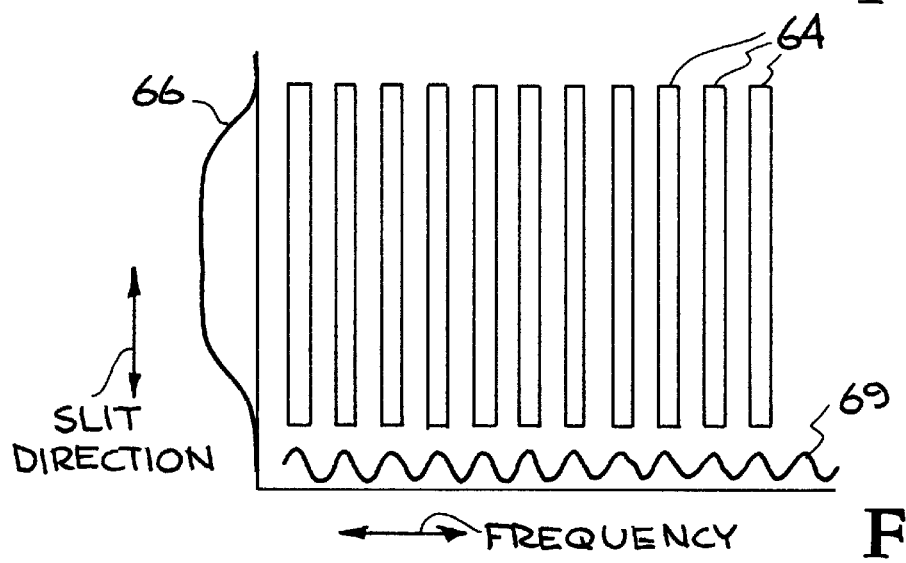
FIGS. 3b and 3c show a nonslanted spectral fringe comb created by interferometer when a single tall fringe overlays the slit.
Figure 3C:
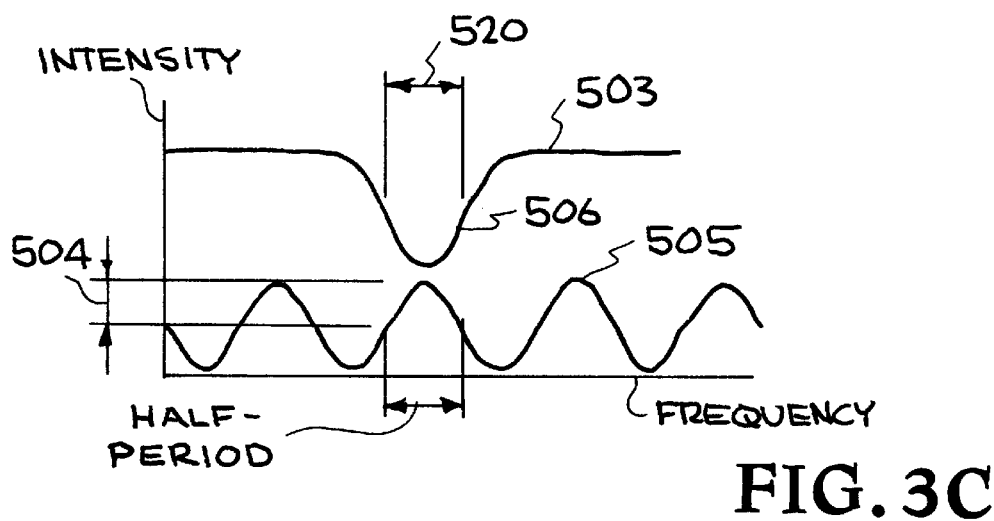

FIG. 3c shows that this delay choice is equivalent to making the half-period 500 of the comb fringes 505 about equal to the typical FWHM linewidth 502 of features in the stellar spectrum 503. This way the "bright" half 504 of the sine wave nicely overlaps the peak or dip 506 of the spectral line. The spectral comb period is given by $\cdot\lambda=(\lambda^2/c\tau)$. For a wavelength of 540 nm, a delay of 11.5 mm produces a comb periodicity of 0.25 Angstrom, which is indeed about twice the typical stellar linewidth.

In FIG. 1 the interferometer is a superimposing Michelson design similar to that described by R. L. Hilliard and G. G. Shepherd, J. Opt. Soc. Amer., vol. 56, p362–369, (1966). The superimposing character improves the fringe visibility from extended sources such as wide fibers that can't be perfectly collimated. Wide fibers are desired to collect star images blurred by atmospheric turbulence. The superimposing type is where the mirror of one arm and the image of the mirror of the other arm are superimposed longitudinally. This can be accomplished by inserting a transparent slab 21 (called the etalon) in one of the arms. This creates a virtual image of the mirror 25 which lies closer to the beamsplitter than the actual distance. The mirror 29 of the other arm is arranged to superimpose via the beamsplitter the virtual image of mirror 25. This creates a non-zero temporal delay, while superimposing the output paths of the rays from both arms. If n and d describe the refractive index and thickness respectively of the etalon, then the resulting delay at the superimposing condition is approximately $\tau c=2d[(n-1)/n+(n-1)]$. (The delay is a roundtrip length). For longer delays than several centimeters, the etalon 21 can be replaced by a real imaging system.

The exact delay can be measured from the fringing spectra of a known spectral reference source, which could be an iodine vapor cell or a neon emission lamp. The wavelengths of the neon spectral lines are well known, and each delay value produces a particular combination of phase shifts for the set of spectral lines. Alternatively, the broadband featureless lamp 3 is used for illumination and the disperser's slit is temporarily made very narrow so that the spectral comb can be resolved. Then the number of comb fringes is counted from one end of the spectrum to the other. The spacing of the fringes is related to the delay. For any wavelength the absolute number of fringes that fit "inside" the delay is $N=c\tau/\lambda$, so that counting the change in N across the spectrum is equated to $c\tau(1/\lambda_1-1/\lambda_2)$. This yields $c\tau$.

In general a Michelson interferometer produces two complementary outputs. In FIG. 1 only one is used, for simplicity. The output traveling back towards the source (toward lens 13) is ignored. To improve efficiency however, both outputs should be used. This can be done with schemes that distinguish the outputs by angles or polarization. If the ingoing beam enters at an angle to the optic axis, then the outgoing beam will travel a different path than the ingoing and it is possible to introduce a mirror to pick it off. An example scheme using polarization is as follows: if the beamsplitter 19 is a polarizing beamsplitter and the incident light is non-polarized or polarized at 45 degrees to the beamsplitter (so that there is significant intensity in both polarizations), and if means to flip the polarization such as quarter-wave retarders are placed in each arm, then both complementary outputs will travel along the same path toward lens 15. They won't create fringes until they are separated by polarization, which can be accomplished for example by a birefringent element downstream from the interferometer but prior to the CCD detector that causes one polarization to strike a different place on the CCD than the other polarization.

In general, a means for slightly varying the interferometer delay for all wavelength channels as a group should be provided, so that the delay can be changed between exposures in evenly sized steps around the circle (360 degrees or 1 average wavelength). This is called phase-stepping. At least three exposures evenly spaced around the circle are needed to uniquely determine fringe phase and amplitude for a given channel if the slit fringe period is infinite. Steps of 90 degrees however are sometimes more convenient than 120 degree steps. In this case, usually 4 or 5 exposures every 90 degrees are made. Since the wavelength changes across the spectrum, the actual detailed value of phase step for a given delay increment •τ will vary with wavelength or frequency channel (•φ=2•c•τ/λ=2•f•τ). The second reason for phase stepping is that it allows common-mode errors that appear to be fringes (such as CCD pixel to pixel gain variations) to be distinguished from true fringes, for only the true fringes will respond the delay in a sinusoidal fashion versus stepped phase.

The means of stepping could be a piezoelectric transducer (PZT) 31 which moves one of the interferometer mirrors 29 or 25. For steps of 90 degrees or less, the PZT could be linearly ramped during the exposure. This is simpler to implement than discrete stepping but washes out the fringe amplitude slightly. For long exposures a stabilization scheme to step and then hold the phase stable against drifts is useful. The approximate phase of the interferometer can be monitored by passing a laser such as a HeNe laser through the same or similar portion of the interferometer cavity and recording the HeNe fringe phase, (taking into account the wavelength ratio of the HeNe to the starlight.)

A means for temporarily preventing interference or fringing behavior should be provided so that an ordinary (nonfringing) intensity spectrum can be recorded on the instrument, while the keeping the rest of the instrument as much as possible in the original configuration. This allows some common-mode behavior to be measured without the confusing effect of fringes, such as measuring the beam profile at the slit and the CCD pixel to pixel gain variation. These common-mode behaviors can then be used during data analysis to divide the fringing spectrum and thereby reduce the common mode errors. Otherwise bumps in the slit beam intensity profile due to vagaries in the optics that have similar periodicity to the fringes could be confused with the true fringes.

Interference can be prevented by blocking either of the interferometer arms, arm A or arm B, such as by shutters 23 and 27 or opaque cards placed manually into the arms. Since the beam profile passing through arm A may be slightly but significantly different than that passing through arm B., both nonfringing spectra (blocking A, blocking B) should be taken and then added later numerically.

Figure 2B:
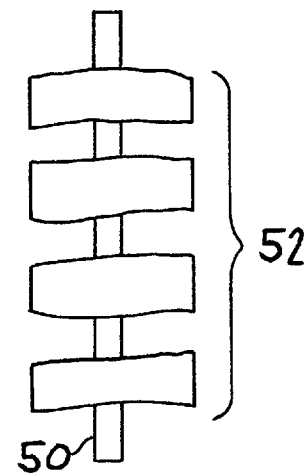
Figure 2C:
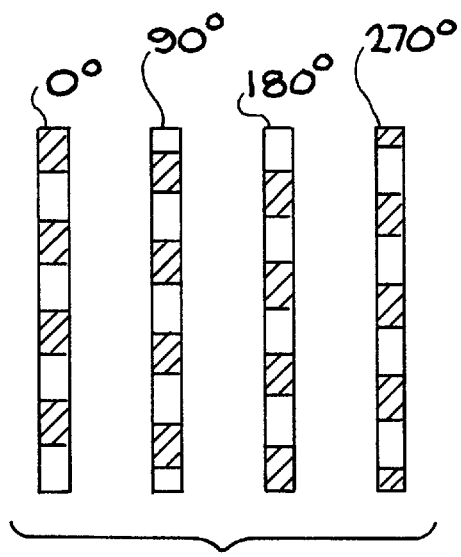
Figure 2D:
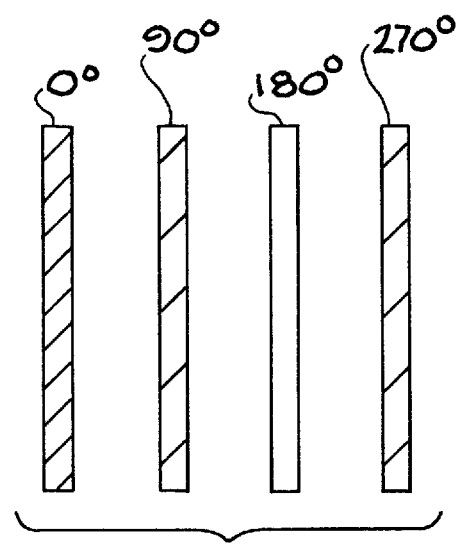

When the two interferometer mirrors 25 and 29 are aligned so that the output rays from both arms superimpose, then an "infinitely tall" fringe is created on the output beam that entirely fills the height of the output beam measured along the slit length (FIG. 2a, item 56). When one of the mirrors is tilted from this condition, a parallel ladder 54 of fringes can be created. To observe the fringes by eye (without the disperser) a temporary monochromatic source such as a laser or mercury lamp can be used. In FIG. 1, a lens system 15 images any ladder of fringes effectively created at mirror planes 29 and 25 to a plane near the slit 33. FIG. 2b shows the appearance to the eye of the fringe ladder 52 overlaying the slit 50. FIG. 2a shows the intensity profile of the beam passing through the slit. The profile 54 has fringes and the profile 56 is for the infinite fringe period case. FIG. 2c shows the action of the phase stepping is to cycle the fringe ladder along the slit. FIG. 2d shows that in the case of infinitely tall fringes, the action of phase stepping is to vary the average intensity sinusoidally versus stepped phase.

The optimum number of fringes in the ladder to span the beam is that which creates the most contrast relative to noise effects. It depends on the imaging capability (and astigmatism) of the disperser along the slit direction. A poorly imaging disperser requires tall or infinitely tall fringes. One should also avoid the spatial scales where the nonfringing intensity variations along the slit or across the CCD in the slit direction are large. In my apparatus measuring starlight I found having 4 to 10 periods spanning the beam produces good contrast against noise. Since my beam occupies about 80 pixels in the slit direction on the CCD, I have about 10 to 20 pixels per slit fringe period.

Figure 4:
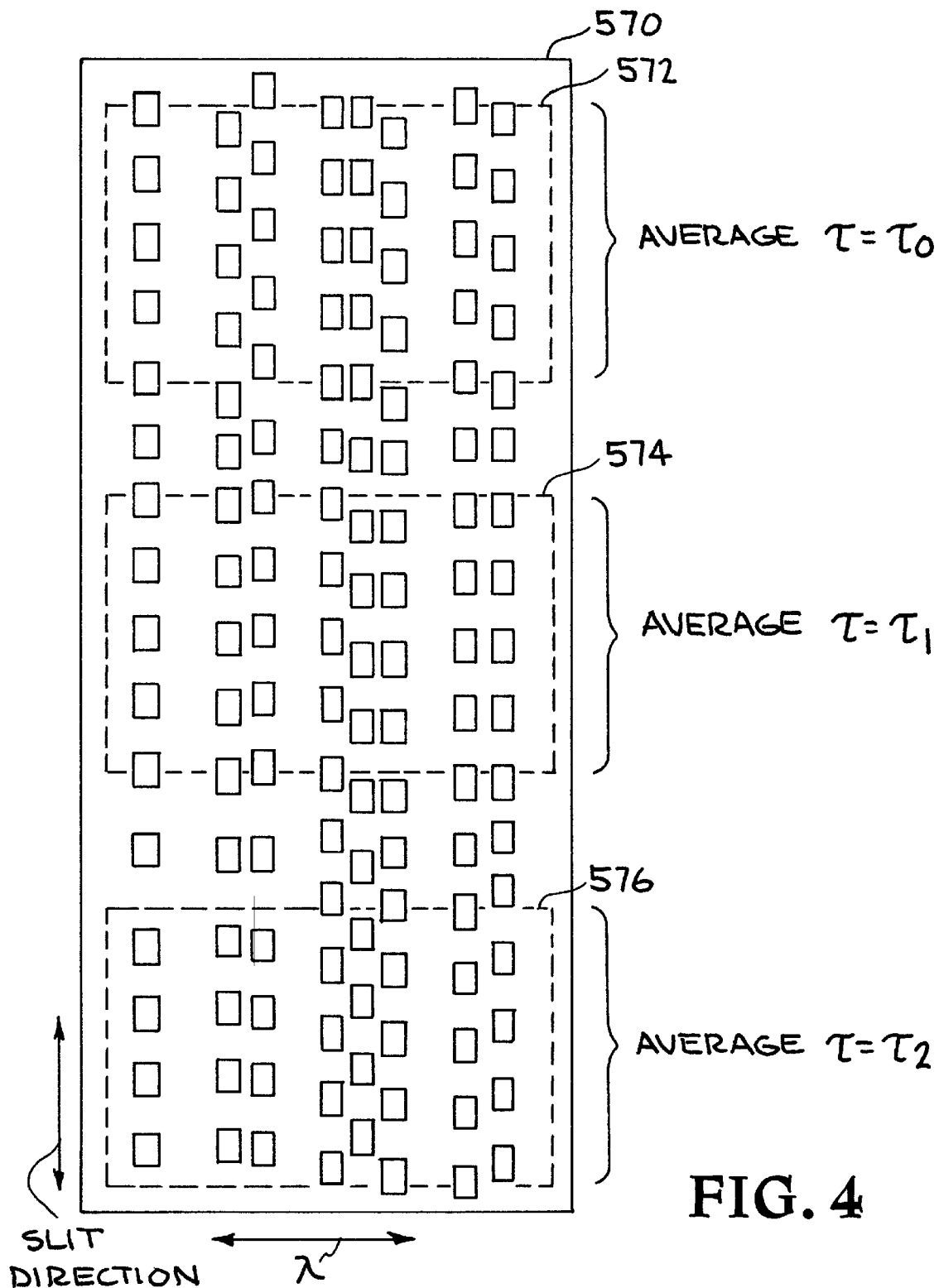
FIG. 4 shows a fringing spectrum having many fringe periods along the slit because the delay varies significantly.

In principle, if hundreds or thousands pixels of the CCD along the slit axis were used to record the slit intensity, then hundreds or thousands of fringes could be recorded along the slit. There is a logical distinction to be made regarding the number of fringes in the slit direction compared to the spectral resolution of the disperser. If I have M fringes along the slit, the wavelength for that channel can be determined independent from knowing the dispersion of the disperser by measuring the period of slit fringes. This can be done to a fractional precision of 1/M. That is, if 1000 fringes exist along the slit, then just from the fringes the relative wavelength of that channel can be determined to 1 part in 1000. If this spectral resolution is finer than the spectral resolution of the disperser (such as controlled by the slit width), and if the illumination spectrum contains fine details of interest on this scale, then it is advantageous to subdivide the fringing spectrum (570 in FIG. 4) vertically (the slit being defined vertical) into subset fringing spectra 572, 574 and 576 etc., each having a slightly different average interferometer delay $\tau_0$, $\tau_1$, $\tau_2$ etc. Then this is a method of creating a set of fringing spectrum taken with a parallel set of different interferometer delays. This method is similar to the method described later where a staircase-like etalon having different thickness segments is substituted for the single thickness etalon 21 in the interferometer cavity. Here, the parallel interferometers are effectively created by the tilt of an interferometer mirror, because different portions of the CCD perpendicular to the dispersion direction are sensing significantly different interferometer delays. The motivation of using parallel delays is that by using a wide range of delays the full information content of the illumination spectrum can be determined so that the spectrum can be mapped. A single delay having only a few fringes together with a low resolution disperser only measures a subset of the full information. This subset is sufficient to determine a Doppler dilation, but is not in general sufficient to map the spectrum at all levels of detail.

Some dispersers have intrinsic astigmatism which reduces contrast of the fringes at the CCD detector in the slit direction. This astigmatism can be compensated for by focusing the fringes to a position slightly ahead or slightly behind the slit plane.

The disperser can be of any type, such as grating or prism. The necessary disperser spectral resolution is approximately the typical feature to feature separation, to reduce crosstalk which mixes fringe phases and tends to reduce average fringe visibility. For stellar spectra this is approximately 1 Angstrom. However, having a higher spectral resolution produces a better signal to noise if it can be obtained without sacrificing throughput, particularly if it is fine enough to resolve the spectral comb due to the interferometer by itself, about 0.25 Angstrom for a 11.5 mm delay. The optimum slit width thus also depends on the size of the source (fiber 5 diameter), since narrow sources allow narrower slit widths without reducing throughput.

It was mentioned that using a narrow slit to resolve the spectral comb improves the signal to noise of determining the whirl. This is because it creates a significant fringe amplitude in every wavelength channel, which helps determine overall common mode errors. However, in order to efficiently collect light the slit should be wide. This may prevent resolving the spectral comb and hence there may be channels with zero or little fringe amplitude. This problem can be alleviated by artificially creating a new set of Moire fringes that are superimposed on the existing ones. This can be accomplished by including an additional interferometer into the beam path anywhere ahead of the detector in FIG. 1, to act as an auxiliary spectral reference. For example, it can be inserted ahead of the iodine cell 7 by using new appropriate imaging optics to reimage the beam at point 11 to create a new small spot similar to point 11. The delay of the additional interferometer can be chosen to be slightly different than the delay of the original interferometer. The sinusoidal spectrum of the new interferometer multiplies the existing spectrum of the beam and creates new Moire fringes and a new component to the net whirl. These new Moire fringes are easily distinguished from the random-like Moire fringes due to the target spectrum by their regular sinusoidal nature. Thus, the detailed value of the new delay does not have to be known. A secondary benefit is that it allows some instrumental error to be determined. Since the new Moire fringes should theoretically be perfectly regular, any deviation of the measured fringe can be assumed to be due to instrumental artifacts.

As an example, if the instrument bandwidth is 6.5% (350 Å out of 5400 Å), then 16 waves of delay change creates 16×6.5%=1 wave of Moire fringe across the 350 Å spectrum. Thus a delay difference between the new and original interferometers of 1600 waves will create a Moire pattern with 100 waves spanning the spectrum Theory of Operation The invention takes advantage of the Moire effect between the sinusoidal frequency behavior of the interferometer and any similar-period sinusoidal-like components of the illumination spectrum. This occurs because the sinusoidal transmission function of the interferometer multiplies the illumination intensity spectrum creating sum and difference "frequency" components, and the sum-frequency components are eliminated by either the blurring of the disperser or equivalent blurring done numerically during data analysis. (Warning, the use of the term "frequency" in this paragraph is different than elsewhere in the document because it's a frequency of a function that is already in frequency-space.) The Moire effect heterodynes high spectral detail to low spectral detail, allowing the use of a low resolution disperser to effectively detect high resolution phenomena. The Moire fringe phase and amplitude versus wavelength channel is represented by a set of vectors called a "whirl".

Another way to describe the heterodyning is to take the Fourier transform of the illumination intensity spectrum to produce an interferogram. The Moire effect translates the interferogram horizontally by a constant offset $\tau_k$ which is the fixed interferometer delay used.

If the goal is to map a spectrum, then during data analysis the heterodyning process can be reversed mathematically, beating the whirl up to higher "frequencies" to restore the original high detail information. If the goal is to measure a Doppler dilation of the spectrum for a fixed delay, or equivalently a change in delay for a fixed spectrum, then the up-heterodyning is unnecessary. The dilation or delay change is determined from the rotation of the Moire whirl.

FIGS. 3a and 3b show the 2-dimensional spectrum of white light after passing through an interferometer of non-zero delay, frequency versus position along the slit. Pretend for the moment that the disperser has perfect spectral resolution—no blurring. A spectral fringe comb 67 exist along the dispersion direction having period •f=1/τ, which for an 11.5 mm delay corresponds to a period of 0.25 Angstrom of green light (5400 Angstrom). In the case of FIG. 3b the interferometer mirrors are in alignment so that there is a tall fringe 66 completely covering the slit. This makes a comb 64 which has vertical fringes parallel to the slit. FIG. 3a shows the case when an interferometer mirror is tilted so that several fringes 65 are created along the slit. This creates a slanted comb 63.

Figure 5A:
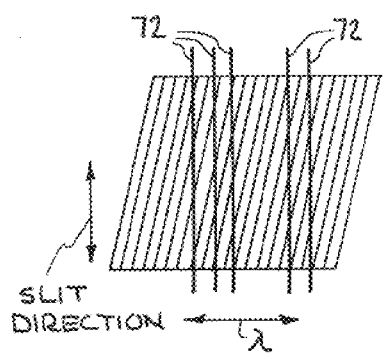
FIG. 5a shows through 5c show the generation of Moire fringes from a slanted fringe comb overlaying spectral lines.

FIG. 5a shows how overlapping the slanted fringe comb 70 with the vertical features 72 of a stellar spectrum creates Moire fringes. These appear as beads along the slit direction if one squints ones eyes at the Figure. A Doppler effect will shift the features slightly in the wavelength direction. This causes the phase of all the Moire fringes to shift vertically, almost uniformly as a block. Not exactly as a block because the phase shift is proportional to frequency, so it grows linearly from the red to blue ends of the spectrum. In my apparatus for example, the spectrum spans 350 Angstroms centered about 5400 Angstrom, so the Doppler phase shift on one end of the spectrum is 7% different than the other end. When the Moire fringe data are expressed as a whirl, a Doppler shift causes the whirl to rotate with a little bit of twist.

Figure 5B:
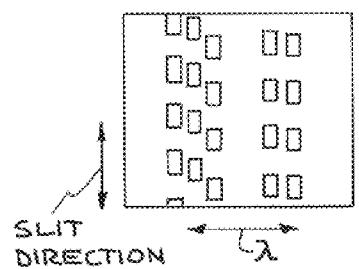
FIG. 5d shows a whirl of Arturus starlight data displayed as pseudofringes.
Figure 5C:
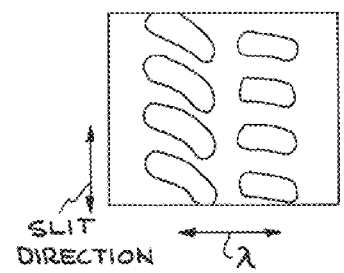

FIG. 5b would be the appearance when the disperser resolution is made coarser to blur away the spectral comb. FIG. 5c would be under further blurring, which could be done numerically when the data is processed.

FIG. 6a shows the benefit of illumination such as starlight or the back-lit iodine spectrum which have spectral features whose detailed wavelengths are randomly related, and the interferometer delay is sufficiently large to cause the phase of these fringes to be randomly and evenly distributed around a cycle. The advantage is that some systematic errors are reduced because they are evenly sampled over all phase-space. FIG. 6b shows a hypothetical fringing spectrum with randomly related phases. FIG. 6a shows that the phases 106 of those fringes are randomly distributed about a circle. Often in interferometry, a systematic error will exist which is dependent on phase. For example, if two signals which are supposed to be in quadrature (so that the arctangent function can be applied to measure their phase angle) are not perfectly in quadrature, then an ellipticity error will result, which has polarity which is positive 100 for some phase angles, and negative 102 for others. Having many fringes sampling all kinds of angles will reduce the net systematic error by a factor of square root of the number of independent fringes, statistically. This can be a significant reduction when many hundreds of stellar or iodine lines are used.

In contrast, FIGS. 6d and 6c show fringe phases 108 which are too similar to each other, such as when a small delay is used, or if the illumination is too monochromatic, or if the continuum portion of a stellar spectrum is used instead of the narrow spectral lines (which is the case for conventional long-baseline interferometers). The similarity of the phases causes the systematic error to be sampled too coarsely, predominantly on one segment 109 of a cycle, increasing the net systematic error.

The relation between the target velocity and whirl rotation is as follows. For a target moving with velocity v toward the apparatus, the wavelength spectrum appears contracted (more energy in the blue) by a factor (1+v/c). This is equivalent to having the delay appear larger by that same factor.

This an increase in delay by •τ=τ(v/c). This is a phase shift (which is equivalent to rotation of a vector in radians) by •ϕ=2•c•τ/λ=2•τv/λ. The velocity per fringe proportionality is (λ/τ)=14090 m/s for a 11.5 mm delay and 540 nm light.

Data Taking Procedure

To measure the Doppler velocity of the sun or star one must measure three kinds of sources 1) the sun/star by itself without the iodine cell, to produce a "sol" whirl; 2) the iodine by itself without the sun/star, illuminated by a featureless lamp, to produce an "io" whirl; and 3) the sun/star with the iodine cell to produce a "solio" whirl. The order of these three steps is unimportant. The terminology comes from the use of sunlight as a test source that has a similar spectrum as starlight. The sol and io whirls need only be measured once, and they are treated as reference whirls. For each solio whirl produced, a Doppler velocity can be determined, using the same sol and io reference whirls.

For each source, ideally four or five fringing spectra exposures are recorded with phase steps of approximately 90 degrees. Also, for each source a nonfringing spectrum is recorded by blocking arm A, and another by blocking arm B.

Making the Whirl from the Fringing Spectrum

For the case of finite slit fringe periodicity, the whirl is obtained from the fringing spectrum by evaluating for each wavelength channel the Fourier sine and cosine amplitudes of the intensity profile along the slit direction at the expected fringe periodicity. This is easily done by multiplying each vertical column of CCD data by a sine wave or cosine wave having the expected periodicity and then summing along the column. To compute Fourier amplitudes properly, the boundary conditions should be periodic. Hence, one should limit the number of pixels in the column to be a integer number of periods. Prior to computing the Fourier amplitude, it is beneficial to normalize the data by dividing out the average intensity profile along the slit. The resulting fluctuations around their average are multiplied by a smooth enveloping function. This envelope smoothly goes to zero at each boundary point, to minimize sharp discontinuities.

Figure 5D:
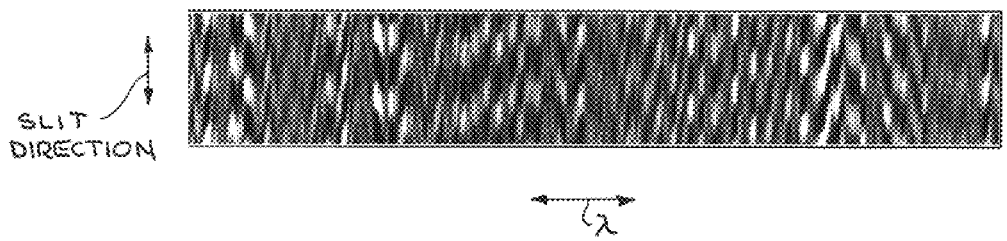

The Fourier sine and cosine amplitudes are assigned to be the rectangular coordinates X, Y of a vector (120 in FIG. 7), for each wavelength channel. In polar coordinates, the vector length (R) and angle (θ) represent the fringe amplitude and phase, respectively. The set of vectors over all channels is called the whirl. FIG. 7a shows the whirl as a meandering path 122 traced out by a wavelength dependent vector, and FIG. 7b the relation between polar and rectangular coordinates. FIG. 5d shows a measured whirl of Arcturus starlight over approximately 140 Angstroms near 5400 Angstroms. This shows only 1000 channels of the 2500 channel CCD. In this method of display, the phase and amplitude are represented by artificial fringes in a calculated intensity map.

For the case of infinite period slit fringes, standard phase stepping algorithms may be used to determine fringe phase and angle for each wavelength channel, using several exposures with incremented delays distributed around the circle. For example, suppose $I_1$, $I_2$, $I_3$, and $I_4$ are the intensities for a given λ channel taken every 90 degrees in phase, sequentially, where the intensity is summed or averaged over all the pixels of a channel. Then the tangent of the average phase angle is given by $\tan \phi = (I_2-I_4)/(I_1-I_3)$, and the average amplitude R given by $R^2(I_1-I_3)^2+(I_2-I_4)^2$. If five exposures are taken, then $I_1$ can be replaced by the average of $I_1$ and $I_5$. This has the advantage of making ϕ less sensitive to changes in the phase step amount due to twisting versus wavelength. Note, the ideal 90 degree step is an average value—the actual step value is proportional to the frequency (c/λ) at the channel, which changes across the spectrum.

Now back to the case of finite fringe period. Even though phase stepping is not required to determined fringe phase and amplitude, phase stepping is recommended as an additional step because it can be used to compute an average whirl which has reduced common-mode errors. These are errors that do not move synchronously with the phase stepping, such as effects of bumps in the slit intensity profile due to beam aberrations, and that escaped complete removal during the normalization step. Let $W_1$ through $W_4$ be the individual whirls computed as described above via Fourier amplitudes, one whirl for each phase step. First one rotates whirls $W_2$ through $W_4$ backwards by the same phase stepped angle each was exposed at, so that all the whirls have the same approximate rotation as $W_1$. Implementing this rotation is easiest if the whirl vectors are in polar coordinates, by offsetting the angle parameter. Then one converts each vector from polar to rectangular coordinates. Then one simply computes the average whirl by vector-adding all the whirls together while in rectangular coordinates and dividing by the number of whirls. If the exposures are taken at even positions around the circle, such as 3 exposures every 120 degrees or 4 exposures every 90 degrees, then the common-mode error component will be zeroed or greatly reduced by this rotate-then-sum process.

Also, as above, a fifth exposure can be taken at the 360 degree phase step position, and averaged together with the 0 degree exposure before substituting for the original 0 degree exposure in the whirl averaging process. This helps reduce the affect of a wavelength dependent phase step by increasing the symmetry of the problem.

The data analysis procedure for determine the Doppler shift will be described. The first step is to prepare the whirls so that they are approximately aligned, to remove any coarse effects of various drifts. The alignment occurs in rotation, twisting, radial magnitude and horizontal (wavelength) translation. These drifts have nothing to do with Doppler shifts and therefore can legitimately be removed. Because the target is measured simultaneous with the iodine spectrum, ideally the drifts should effect both whirl components, sol and io. However, in reality because the iodine lines and stellar lines don't occur at exactly the same place, the drifts can slightly affect the Doppler result, and therefore it is best to remove the drifts when possible.

During this alignment procedure, a solio whirl, usually the first, is designated to be the "standard" to which all other whirls are aligned. Then the input whirl to be aligned is rotated, twisted, expanded in magnitude and translated horizontally to essentially minimize the root means square difference between it and the standard whirl. This is only an approximate process meant to remove gross drifts. All the solio whirls and the sol and io reference whirls are aligned this way to the standard solio.

Figure 8:
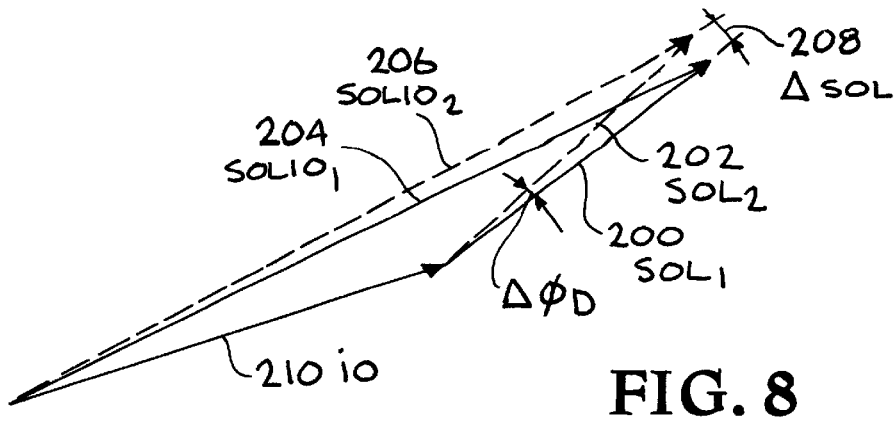
FIG. 8 shows the vector relationships of the sol and is whirl components under effect of a Doppler rotation.

FIG. 8 illustrates that a Doppler effect rotates the sol whirl component relative to the io whirl component by an angle •φ. The vectors of FIG. 8 represent whirls, which are themselves aggregates of vectors. It is presumed that the solio whirl is a linear combination of sol and io whirls, added vectorally channel by channel. Suppose $solio_1$ and $solio_2$ are the solio whirls measured on two different occasions. FIG. 8 supposes that these whirls have already been aligned so that their io components 210 are superimposed. Then a Doppler effect rotates the $sol_2$ component (202) relative to the $sol_1$ component 200. Therefore, the difference between $solio_1$ and $solio_2$ is a small vector •sol (208) which is approximately perpendicular to $sol_1$ or $sol_2$. The phase angle due to the Doppler effect, •φ, can be found by taking the arctangent of length of •sol relative to the length of $sol_1$. The length of •sol can be found by applying dot products, since it is known that •sol is perpendicular to $sol_1$.

The dot product between two whirls is defined to be the individual dot product of the two vectors for a channel, summed or averaged over all channels. Let a whirl in rectangular coordinates be the set of vectors $W=[X(\lambda),Y(\lambda)]$, where X, Y are the cosine and sine fringe amplitudes respectively. Then the dot product between two whirls $W_1$ and $W_2$ is $$W_1 * W_2 = \cdot X_1(\lambda)X_2(\lambda) + Y_1(\lambda)Y_2(\lambda) \qquad \text{Eq. 1}$$

summed over all λ channels. This could be called a "generalized" dot product because it sums products over both the spatial and wavelength indices.

The procedure of FIG. 8 was a simple approximation that made assumptions about the constancy of the magnitude of sol and io components. A more exact analysis is now described. This solves for the rotational position of the sol whirl component relative to the io whirl by application of (generalized) dot products and solving the resulting 4 equations in 4 unknowns. The input to the process is a solio whirl and the output is an angular difference which can be converted to a velocity. It is assumed that the sol and io whirls have previously been measured and are used as reference whirls, the same each input solio.

The solio whirl is assumed to be a linear combination of 4 components: sol, $sol_\perp$, io and $io_\perp$, where $sol_\perp$ and $io_\perp$ are perpendicular whirls made by rotating sol and io by 90 degrees. (This can be conveniently done by switching the $X(\lambda)$ and $Y(\lambda)$ components and flipping the polarity of one of them.) If low pass filtering is not performed and a significant spectral comb component due to the interferometer on the continuum is present, then two additional terms of comb and $comb_\perp$ can be added. The analysis below assumes these terms are not needed because these spectral comb components have been filtered away.

Let a solio be expressed as the linear combination:

$$solio = A_S\ io + A_t\ io_\perp + B_S\ sol + B_t\ sol_\perp, \qquad \text{Eq. 2}$$

where the coefficients $A_S$, $A_t$, $B_S$, and $B_t$ hold the magnitude and rotational information. For each solio whirl measured the following set of dot products are computed using the same io and sol whirls, measured separately:

$$T_{ik} = io * solio \qquad \text{Eq. 3}$$

$$T_{ipk} = io_\perp * solio \qquad \text{Eq. 4}$$

$$T_{sk} = sol * solio \qquad \text{Eq. 5}$$

$$T_{spk} = sol_\perp * solio \qquad \text{Eq. 6}$$

Hence a set of Tik etc. coefficients are computed for each solio to be processed. Previously, the dot products involving the reference whirls have been computed:

$$T_1 = io * sol \qquad \text{Eq. 7}$$

$$T_2 = io * sol_\perp \qquad \text{Eq. 8}$$

$$T_3 = sol * sol \qquad \text{Eq. 9}$$

$$T_4 = io * io \qquad \text{Eq. 10}$$

Now we have 4 equations in 4 unknowns ($A_s$, $A_t$, $B_s$, $B_t$) which can be exactly solved by standard linear algebra procedures, such as by "Kramers rule" which uses determinants. The 4 equations are:

| | | | | |
|---|---|---|---|---|
| $T_{ik} = T_4 A_s$ | $+0$ | $+T_1 B_s$ | $+T_2 B_t$ | Eq. 11a |
| $T_{ipk} = 0$ | $+T_4 A_t$ | $-T_2 B_s$ | $+T_1 B_t$ | Eq. 11b |
| $T_{sk} = T_1 A_s$ | $-T_2 A_t$ | $+T_3 B_s$ | $+0$ | Eq. 11c |
| $T_{spk} = T_2 A_s$ | $+T_1 A_t$ | $+0$ | $+T_3 B_t$ | Eq. 11d |

Once ($A_S$, $A_t$, $B_S$, $B_t$) have been determined for a given $solio_n$, then the values for the angles $\phi_{io}$ and $\phi_{sol}$ are found corresponding to that solio, which describe the rotational orientation of the component io and sol within solio. The values are found through $$\phi_{io} = \arctan(A_t/A_S) \qquad \text{Eq. 12a}$$

$$\phi_{sol} = \arctan(B_t/B_S). \qquad \text{Eq. 12b}$$

The Doppler shift •$\phi_D$ involves the rotation of sol relative to io. Hence, $$\phi_D = \phi_{sol} - \phi_{io} \qquad \text{Eq. 13}$$

is the net angle between sol and io; and the change in the net angle between two occasions 1 and 2 is $$\cdot\phi_D = \phi_{D2} - \phi_{D1} \qquad \text{Eq. 14}$$

The Doppler velocity •v is found from the angle •$\phi_D$ by $$\cdot v = (\cdot\phi_D/2\cdot)c(\lambda/c\tau), \qquad \text{Eq. 15}$$

where λ is the average wavelength.

The capabilities of this apparatus have been tested by measuring Doppler velocities of a stationary source consisting of a bromine lamp back-illuminated by white light. Over 20 minutes and seventeen independent measurements the repeatability of the measurements was 0.76 m/s, of which a significant portion may have been photon noise. This corresponds to a broadband phase shift repeatability of 1/20,000th of a wave, which is much better than conventional phase shift measurements using monochromatic illumination.

Metrology Based on Dilation of an Interferometer Cavity

Figure 9:
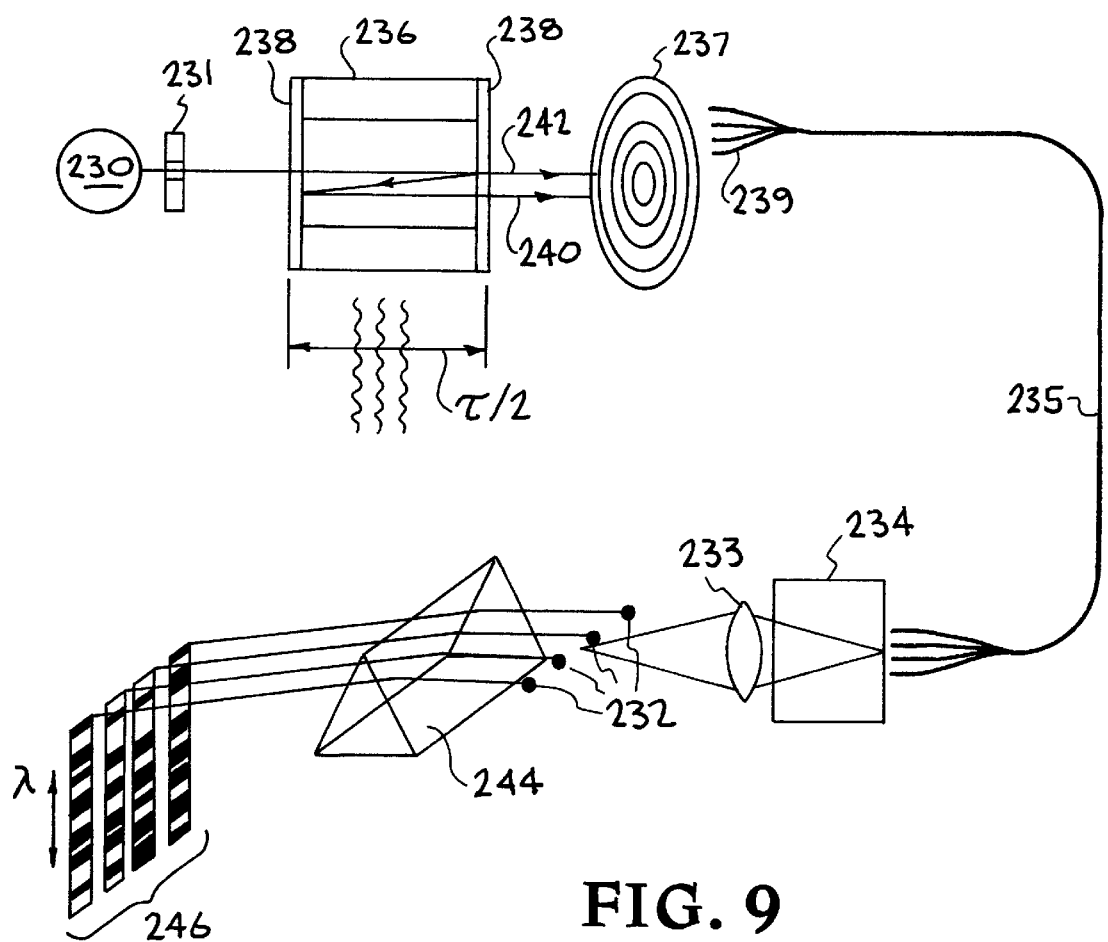
FIG. 9 shows an embodiment that measures a secondary effect through changes in interferometer delay using broadband illumination.

FIG. 9 shows an embodiment of the invention for measuring secondary effects such as temperature, air pressure and acceleration which can be made to change an interferometer delay, such as through motion of a cavity mirror or the refractive index of a medium internal to the interferometer. This operates on the principle that if the illumination spectrum is constant, then a rotation of the whirl must be due to the delay change c•τ=(•φ/2•). A convenient spectrum to use is the iodine absorption spectrum illuminated by featureless light. This is provided by the iodine cell 234 back-illuminated by a white lamp 230. The iodine cell can be anywhere along the optical path. It may be convenient to have it just ahead of the disperser, rather than near the interferometer, because presumably it is desirable to make optics near the interferometer compact so that it can be used as a remote probe at the end of an optical fiber 235. FIG. 9 uses a low-finesse Fabry-Perot interferometer as the interferometer to illustrate that it is possible to use non-Michelson interferometers to produce sinusoidal-like fringes provided means are employed to discriminate against the higher harmonics of the fringe shape. Such means include phase stepping at 90 degree steps or sampling the slit fringe at quarter wave intervals. Fabry-Perot interferometers are advantageous because they are compact. The finesse must be low, which is accomplished by using poorly reflective mirrors in the Fabry-Perot cavity, for example, a reflectivity of 27%.

In FIG. 9 the light from lamp 230 passing through a pinhole 231 creates ring-like fringes 237 due to the interference of multiple reflections 240, 242 between the two partially reflecting mirrors 238 that define the interferometer cavity. The delay is equal to the roundtrip length of a ray between the mirrors. The effect to be measured is presumed to alter the optical path length between the two mirrors. For example, temperature could dilate the length of the spacer 236 that controls the mirror spacing. A means for sampling the ring fringes every quarter wave at 239 (quadrature sensing) is provided by the 4-fiber bundle 235. A lens 233 images the four fiber outputs to separate spots 232 on the disperser slit. A detector with an imaging disperser symbolically represented by the prism 244 records a fringing spectrum for each of the four quadrature sensing spots 238.

Figure 10A:
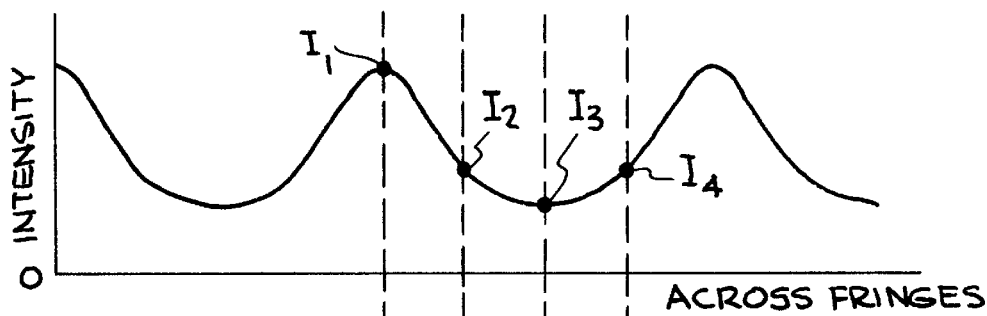
FIGS. 10a through 10c shows how to use the sinusoidal component of a low-finesse Fabry-Perot interferometer.
Figure 10B:
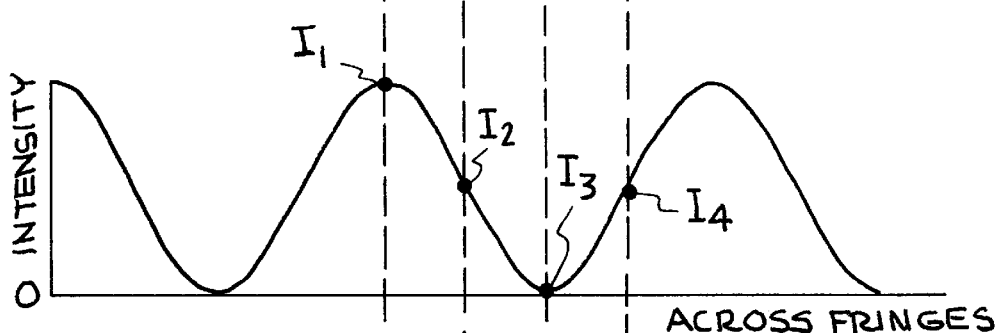
Figure 10C:
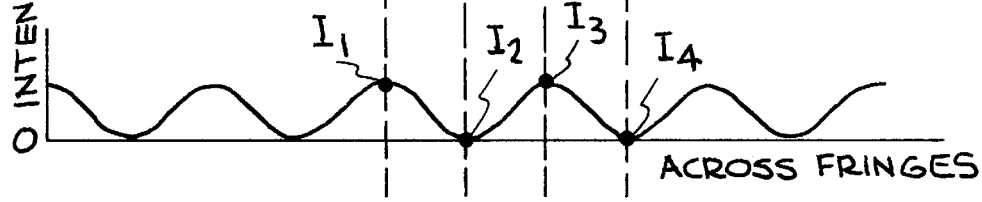

FIGS. 10*a* through 10*c* show how the non-sinusoidal component of the Fabry-Perot fringes can be discriminated against using quadrature sampling along the "slit". FIG. 10*a* shows the fringe intensity across the diameter of the ring pattern for a Fabry-Perot with mirror reflectivity approximately 27%. It has a large fundamental sinusoidal component (FIG. 10*b*), but with significant components at higher harmonics, such as the 2nd harmonic shown in FIG. 10*c*. The principle is to sample the fringe with few enough samples so that only the fundamental period is resolved, and the shorter spatial period harmonics are not resolved because they do not satisfy the Nyquist criteria. When the intensity is measured every 90 degrees, then the fundamental is resolved, but the 2nd and higher harmonics have only 2 samples per period, and so are unresolved. For example for the second harmonic, if we apply the $R^2=(I_1-I_3)^2+(I_2-I_4)^2$ relation to find the fringe amplitude, FIG. 10*c* shows that the differences $(I_1-I_3)$ and $(I_2-I_4)$ are zero.

Figure 10D:
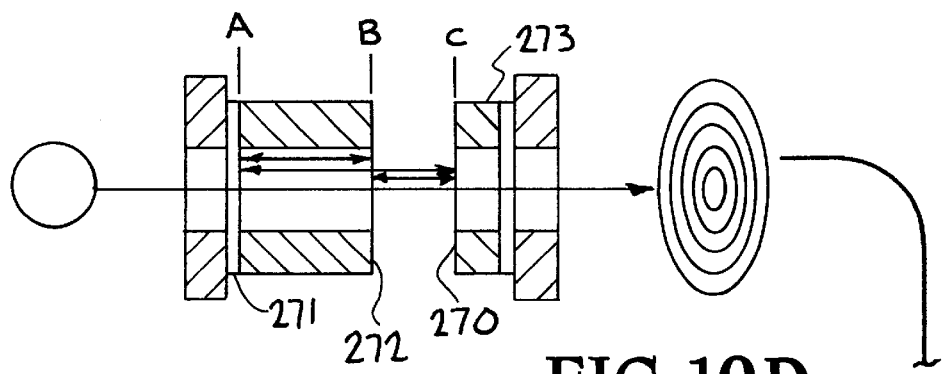
FIG. 10d shows the inclusion of an additional cavity as a means for phase stepping.

Another method of quadrature sampling is to phase step every quarter wave. This can be done with a single fiber instead of a 4-fiber bundle. However, because the delay is now being changed, an independent method of determining the delay accurately is needed. This can be provided by inserting an additional partially reflective surface C in series with the first interferometer, and have the secondary effect affect only one of the interferometer cavities AB. In FIG. 10*d*, a partially reflective surface 270 (labeled "C") is included in addition to the existing surfaces A (271) and B (272). A PZT transducer 273 moves this surface to create phase stepping. Three Fabry-Perot cavities exist instead of one: A to B, B to C, and A to C. Three sets of ring fringes will be produced. Thus the net whirl derived from this apparatus will have three component whirls corresponding to the three interferometer delays, $\tau_{AB}$, $\tau_{BC}$ and $\tau_{AC}$. The delays are chosen to be different enough so that the whirls are approximately orthogonal. Orthogonal means that their dot product is several times smaller than either self-dot product. This occurs when the delay is many waves different from each other so that there is at least one cycle of twist. For example, if the spectrum spans a 5% change in wavelength, then 20 waves (average wavelength) of delay difference will create 1 cycle of twist, which makes the two whirls orthogonal. Greater number of twists are preferred to improve orthogonality.

A dot-product analysis analogous to that described above for the Doppler effect can be used to determine the rotations of the three whirl components corresponding to the three delays. The twists can be anticipated by twisting the reference whirls by an appropriate amount. Then the delay change corresponding to cavity AB yields the secondary effect to be measured.

Measurement of Angles using a Long Baseline Interferometer

Figure 11:
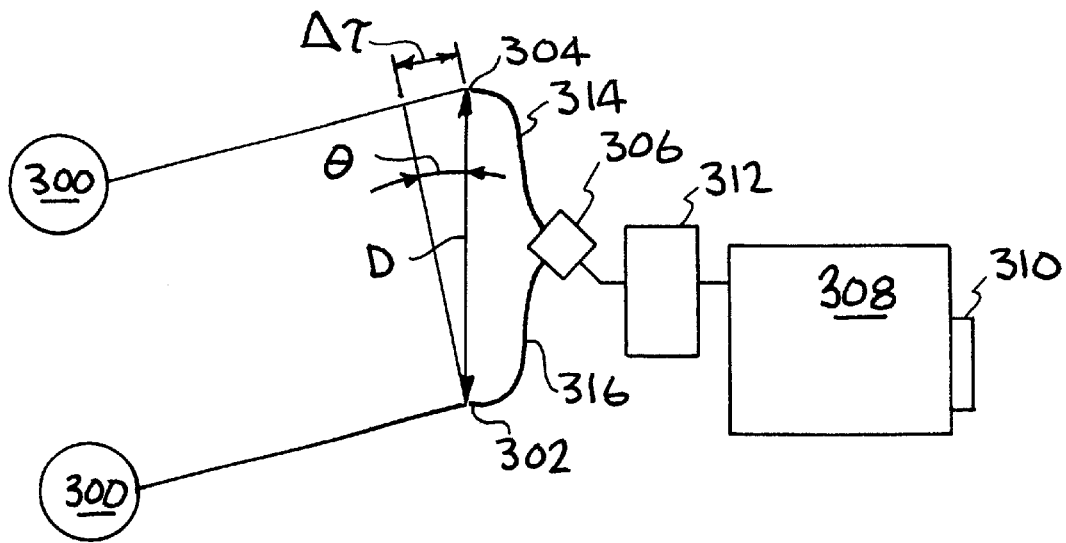
FIGS. 11a and 11b show embodiments that measures angles through phase shifts of a long baseline interferometer.
Figure 11:
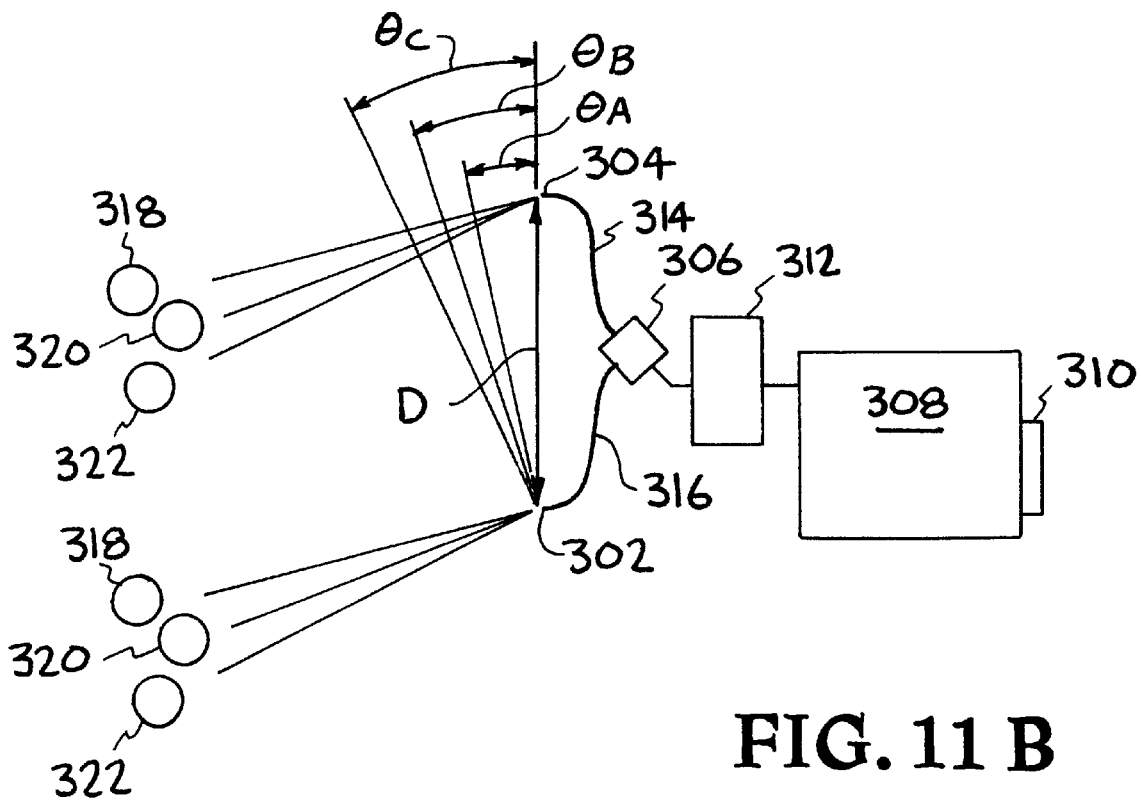

Long baseline interferometers use phase shifts to measure angular positions of a distant targets. Hence, an embodiment of this invention substituting a long baseline interferometer for the interferometer can measure angular positions very accurately, by associating whirl rotation and twist with target angle. FIG. 11 shows an embodiment that incorporates a long baseline interferometer. The interferometer consists of the triangle formed by the target 300, and the left 302 and right 304 collection ports. In order to draw the nearly parallel rays of light from the distant target, the target 300 is drawn twice. The collection ports are spaced a distance D apart, called the baseline distance. The light entering the collection ports are conducted via paths 314 and 316 to a beamsplitter 306 where the light interferes with light from the other collection port. Since the two streams of light originated from the same star at small angle, they are nearly identical but arrive at different times depending on the angular position θ of the target relative to the baseline. Suppose for the moment that the two optical paths 314 and 316 have the same length, so we can ignore their contribution to the arrival time difference. The arrival time difference forms the delay τ of the invention, and the inclusion of a disperser 308 creates a fringing spectrum recorded at a CCD detector 310. Tilting the beams slightly with respect to each other at the beamsplitter creates fringes across the slit of the disperser. A mirror moved by a PZT transducer that changes the path of one of the beams prior to interfering could provide the phase stepping.

Narrow spectral features are desired to measure large angles. Although it is possible to use the intrinsic spectral lines of the star (target), if the star is moving the Doppler effect may confuse the angular determination. Hence it is much better to insert an iodine vapor cell 312 into the beam to imprint a known and stable spectrum. This allows measuring angles of targets lacking spectral features, not limited to stars. Furthermore, the linewidths of iodine are about 8 times narrower than stellar lines, so that the maximum delays can be 8 times longer (about 80 mm). This allows measuring angles 8 time larger than without the iodine cell. (The stellar component of the whirl can be ignored because it is sufficiently orthogonal to the iodine whirl for large bandwidth spectra. Hence, lets omit further discussion of the stellar component.)

Let an earlier measurement of the target be defined as a reference whirl. Then the rotational position of the current target whirl relative to the reference can be determined by taking dot products against the reference whirl an its perpendicular whirl, analogous to the Doppler analysis described earlier. The reference whirl may have to be artificially twisted in order improve the alignment with the target whirl if the angle is large. The resulting whirl angle change •φ is related to the target angle change by •θ=(λ/D)(•φ/2•).

Alternatively, a reference whirl is constructed mathematically from the known iodine spectrum. This can be done by Fourier transforming the iodine spectrum to form an interferogram, translating it by a delay $\tau_0$, mimicing the enveloping action of the disperser blur, and then inverse Fourier transforming to form the theoretical whirl. The $\tau_0$ that produces the best agreement with the measured whirl yields the angle through $\theta=c\tau_0/D$, if the paths 314, 316 are of equal length. The rotational polarity of the whirl (which is controlled in an actual instrument by the polarity of mirror tilt) will determine the polarity of the angle θ.

Note that the technique works with arrival times that are significantly non-zero, and cannot work with exactly zero arrival times because then the spectral comb is too broad compared to the spectrum's total width (the continuum portion). This is distinct from conventional long baseline interferometers which work best for near zero arrival times.

The paths 314 and 316 may be different by some amount •s, which directly adds to the apparent delay τ. In practice it may be difficult to measure or stabilize •s to sufficient accuracy. Furthermore, when slit fringes or phase stepping is used this creates an uncertainty in the delay. FIG. 11b shows that a solution is to use a second star (reference$_A$ star, 318) and have light of both stars travel through the same paths 314 and 316. This can be accomplished by using beamsplitting systems to combine light at the collection ports 302 and 304. The net whirl will then contain two component whirls, which can be distinguished during the dot product procedure when the angles are sufficiently different, so that there are at least one twist in the whirl relative to each other. In other words, so that whirls are sufficiently orthogonal that they can be distinguished from each other. This method yields a difference in angles between the target star 320 and reference$_A$ star 318. The slit fringes can be implemented by tilting the angle at which the light from the two paths 314 and 316 join each other at the beamsplitter.

In a similar way, the baseline distance D may be uncertain. This uncertainty can be removed from the problem by observing a third star, and having its light pass through the same paths as the other two stars, by means of beamsplitting at the collection ports 304 and 306. This can measure the angular distance of the target star 320 relative to the angular separation between the two reference stars 318 and 322.

The technique is distinct from the spectroscopic method of Kandpal in several important ways:

1) The Kandpal technique does heterodyne or produce Moire fringes between the interferometer and any narrow spectral features of the target spectrum. The modulations created by the interference are resolved directly by the disperser.
2) An iodine cell or other imprinted reference spectrum having narrow lines is not used in the Kandpal method.
3) There is no phase stepping or slit fringes. Consequently, fringe phase and amplitude (2-d vector information) is not obtained from a given λ-channel independent of others. Only a scalar (intensity) spectrum is measured. The modulations they observed are versus wavelength channel rather than versus delay. Hence, the phase and amplitude of a fringe for a given wavelength channel in isolation from other, cannot be determined without prior knowledge of the intensity spectrum. This is especially critical when the intrinsic (nonfringing) stellar spectrum has narrow dips and peaks of similar width as the sinusoidal modulations, such as is the case when larger delays are used.

Because only scalar and not vector information is measured for each wavelength channel, the polarity of the modulations cannot be determined, so whether light from a star comes from the left or right of the perpendicular to the baseline cannot be distinguished.

4) The interferometer delay for Kandpal is limited to very small values of about 10 microns, set by the reciprocal of the spectral resolution of the disperser. In contrast, in my invention the delay can be 8000 times larger (80 mm versus 10 microns) because the iodine spectrum is heterodyning against the interferometer spectral comb. This means 8000 times larger angles can be measured for the same baseline. This is a significant practical advantage because it makes it much more likely to find neighboring stars to use as positional references.

Spectral Mapping

Figure 12A:
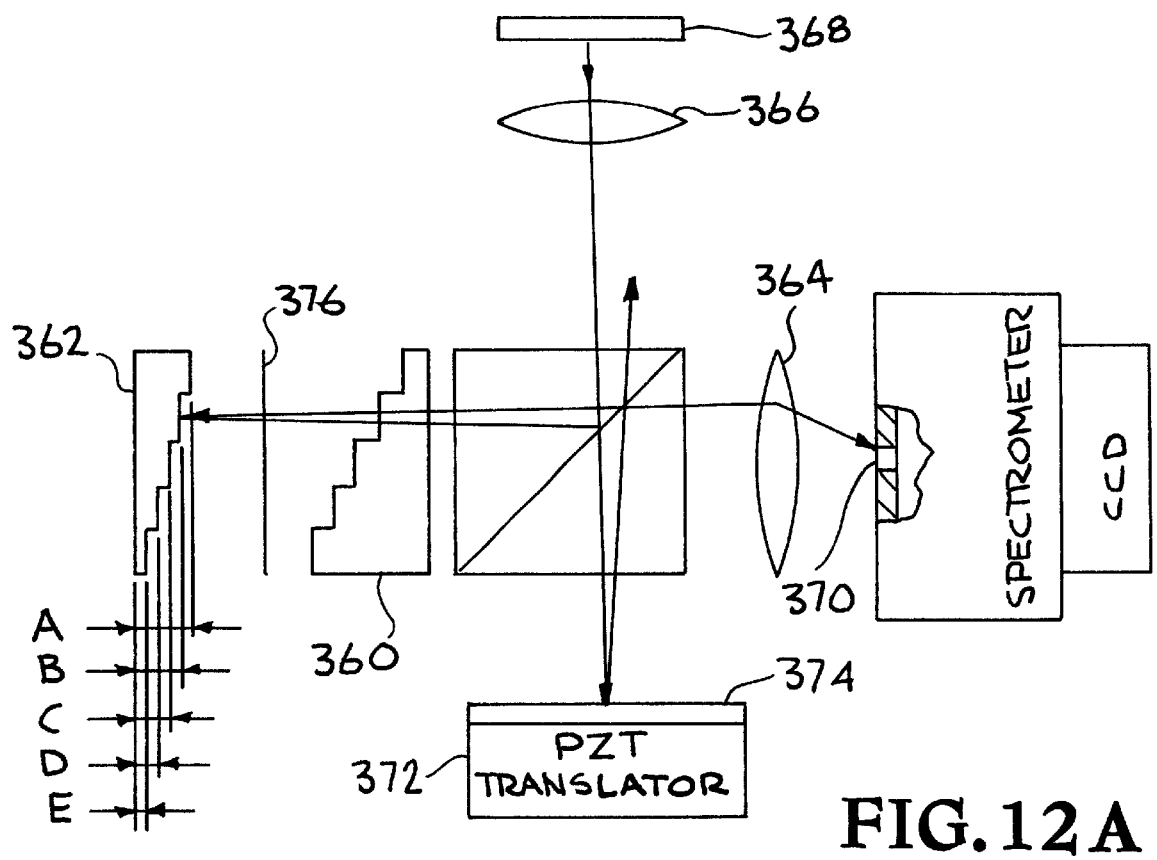
FIGS. 12a and 12b show an embodiment that creates multiple simultaneous fringing spectra having different delays.

An embodiment of the invention which is useful for mapping a spectrum is shown in FIG. 12a. The single delay is replaced by a parallel set of delays having a range of values that cover the coherence length of the illumination. An internal interferometer mirror 25 is replaced by a stepped or staircase-like mirror 362 which is segmented into steps of different thickness labeled A through E. Furthermore, in order to preserve the superimposing condition which improves fringe visibility, the etalon 21 of the instrument in FIG. 1 is optimally replaced by a staircase etalon 360 which is segmented into steps also labeled A through E that correspond to the steps of the staircase mirror. Each segment A of the mirror 362 and etalon 360 is imaged to an independent location of the disperser slit 370 by a lens system 364. Similarly, a lens system 366 images a slit-like source 368 to the segments, presenting the same spectrum to all segments.

The stepped nature of the etalon and mirror are not to be confused with a grating, because the beamlets from the etalon segments do not interfere with each other, as they would in a grating. Instead, they are imaged to separate locations on the CCD to form separate fringing spectra. All these fringing spectra can be phase stepped simultaneously by the PZT 372, and have the same slit fringe periodicity by tilting mirror $M_1$ (374).

Figure 12B:
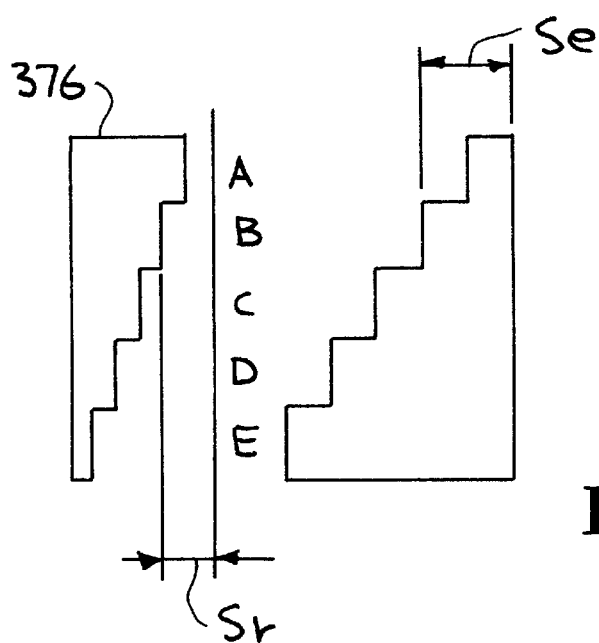

FIG. 12b shows that the individual etalon segment thickness $S_e$ and mirror segment location $S_r$ are chosen so that for each segment the apparent mirror segment so-created lies in the same plane 376. This is done by setting $S_e(n-1)/n=S_r$. (The apparent mirror is the actual mirror shifted forward by the virtual imaging of the etalon slab.) This apparent mirror 376 is optimally superimposed with the mirror $M_1$ (374) of the other interferometer arm by action of the beamsplitter.

Figure 13A:
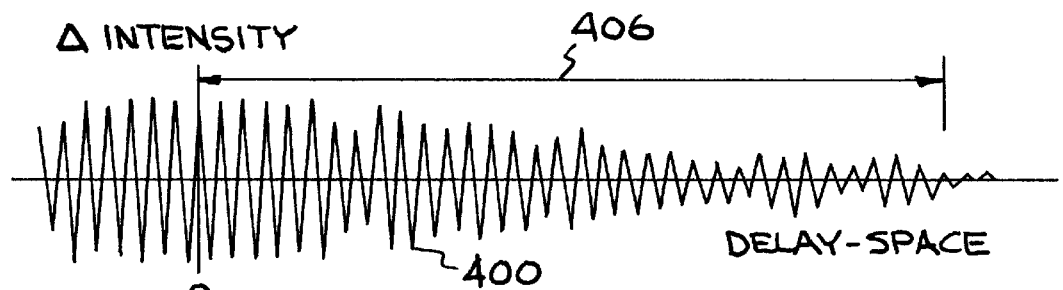
FIGS. 13a through 13d shows how to reconstruct an interferogram from interferogram segments made from whirls.

FIG. 13a represents an interferogram 400 of the instrinsic illumination spectrum at the slit 368, with perfect spectral resolution. An interferogram is the Fourier transform of the intensity spectrum. It's shape contains all the information needed to reconstruct a spectrum. (It will be symmetrical about zero delay, so only one side needs to be shown or measured. This is consequence of the intensity spectrum being a real function.) An interferogram is useful to explain the action of the heterodyning process that creates a whirl, and the spectral resolution of a system.

Figure 13B:
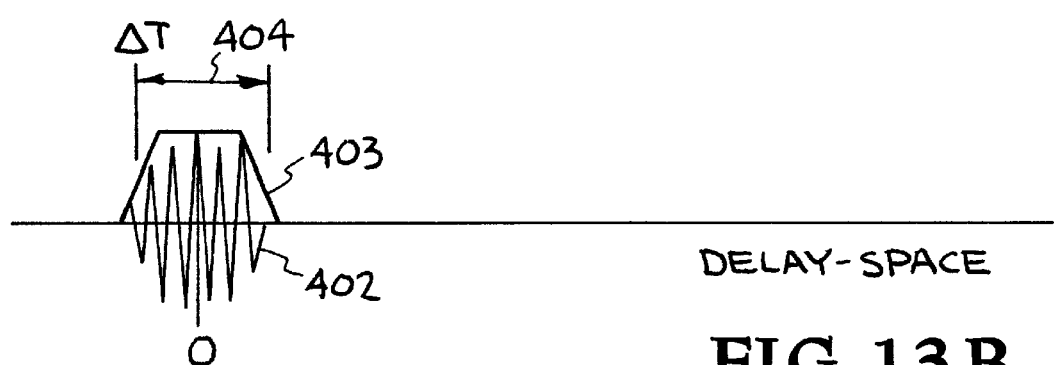
Figure 13C:
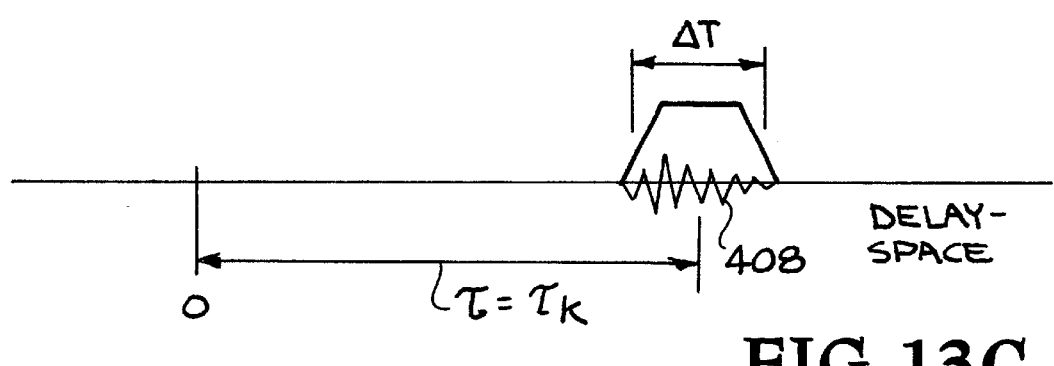
Figure 13D:
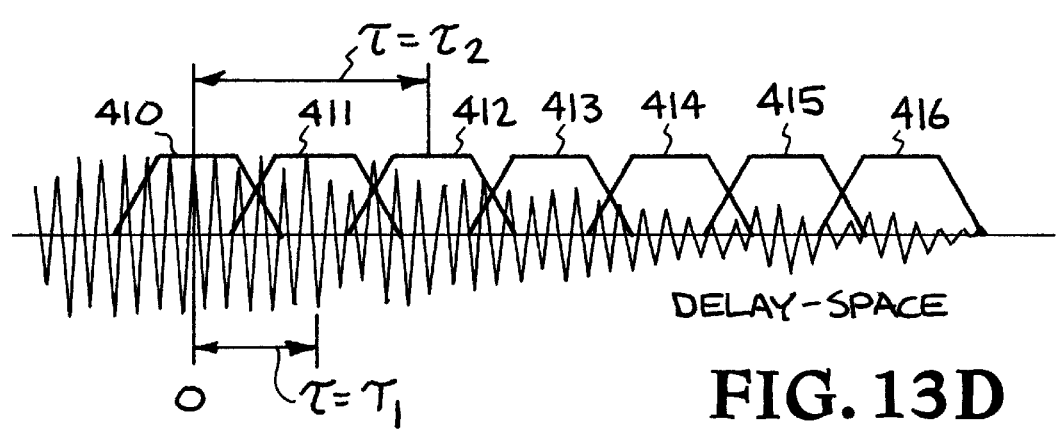

FIG. 13b shows that a disperser that has low spectral resolution only preserves the portion 402 of the original interferogram 400 in a small range 404 near zero, having width •T. The goal of a high resolution spectrometer system is to preserve all the interferogram information by having a large range, which is at least as large as the illumination coherence length 406. FIG. 13c shows that due to the heterodyning process that creates Moire fringes, the Fourier transform of a whirl created with delay $\tau_k$ will be the portion 408 of interferogram 400, centered at $\tau=\tau_k$ with width •T. Hence, FIG. 13d shows that with a set of parallel delays of different values $\tau_a$, $\tau_b$, $\tau_c$, $\tau_d$ etc., the apparatus of FIG. 12a can measure the whole range of the interferogram using a contiguous set of segments (410 through 416), the delay values chosen so that each range is shoulder to shoulder with its neighbor.

Hence the data analysis procedure for mapping a spectrum is as follows: For each whirl $W_k$ measured with delay $\tau_k$, the Fourier transform is performed to create an interferogram segment $Q_k$. This segment is shifted toward increasing $\tau$ by the amount $\tau_k$ to form an adjusted interferogram segment. After this is done for all the whirls, all the adjusted segments are concatenated together to form a 1-sided concatenated interferogram. The 2-sided interferogram must be symmetric about zero delay, since the intensity spectrum is known to be a real function. Therefore the next step is to copy the 1-side to the other side by reflecting about zero delay to form the full spectrum. This is then inverse Fourier transformed to form the net output whirl. The magnitude (vector length) of this whirl versus wavelength channel forms the output intensity spectrum.

The Fourier transforms of whirls should be a complex Fourier transform. Since frequency and delay $\tau$ are Fourier transform pairs, I should use here the terminology of "frequency" instead of "wavelength" to be mathematically correct. Let each frequency (wavelength) channel be designated by an index f. The vector of each f-channel needs to be expressed in rectangular coordinates, so that the whirl consists of real and imaginary functions of f having N points, where N should be even and ideally padded by zeros so that it is a power of two to speed computation. The discrete fast Fourier transform (FFT) of a complex function W(f) having N points produces another complex function $Q(\tau)$ of N points. FFT algorithms are well known. For example, $Q(\tau)=$ •W(f) $e^{(2 \cdot ift/N)}$, where the sum is over f=0 to f=N−1.

The concatenation process needs to use appropriate enveloping to undo the non-constant enveloping effect of the disperser, so that the transition from one adjusted interferogram segment to the neighboring one, which may overlap, is smooth and does not artificially emphasize or de-emphasize portions of the true interferogram. In other words, realistic dispersers will envelope or multiply the true interferogram amplitude by a function which is bumpy and non-uniform. This is undesirable. This instrument enveloping behavior can be determined through calibration procedures where a known spectrum is measured. The instrumental enveloping behavior is divided out the of the interferogram segment Q. Then to facilitate gradual transition in the concatenation between neighboring segments, an artificially created envelope 403 having the shape of a trapezoid with sloping sides is multiplied against segment Q. That way, in the transition regions where the segments overlap and sum, the concatenated interferogram will have the proper total amplitude while gradually changing from one segment to another.

I claim:

1. An apparatus for measuring the spectral characteristics of a multifrequency source of electromagnetic radiation, comprising:

means for receiving a beam of electromagnetic radiation from said source; and means for producing a vector spectrum from said electromagnetic radiation.

2. The apparatus of claim 1, wherein said means for producing a vector spectrum from said electromagnetic radiation comprises;

means for dispersing said electromagnetic radiation into individual channels organized by wavelength;

means for interfering said electromagnetic radiation with a delayed copy of itself to produce fringes; and for at least one individual channel, means for determining fringe phase and amplitude of the sinusoidal component of said fringes.

3. The apparatus of claim 2, further comprising means for dithering the amount of delay between said electromagnetic radiation and said delayed copy by at least ½ of a wavelength to separate the sinusoidal variation due to fringes from the sinusoidal variation due to noise.

4. The apparatus of claim 1, wherein said means for producing a vector spectrum comprises:

means for interfering said electromagnetic radiation with a delayed copy of itself to produce an interfered beam, wherein said interfered beam comprises fringes;

means for dispersing said interfered beam into independent channels organized by wavelength to create a fringing spectrum; and for at least one individual channel, means for determining the fringe phase and amplitude of the sinusoidal component of said fringing spectrum to produce a vector spectrum.

5. The apparatus of claim 1, wherein the step of producing a vector spectrum comprises:

means for dispersing said electromagnetic radiation into independent channels organized by wavelength to create a fringing spectrum;

means for interfering said electromagnetic radiation with a delayed copy of itself to produce an interfered beam, wherein said interfered beam comprises fringes; and for at least one individual channel, determining the fringe phase and amplitude of the sinusoidal component of said fringing spectrum to produce a vector spectrum.

6. The apparatus of claim 4, wherein said fringes comprise at least one half wave of spatial delay change that is spatially splayed across said interfered beam in a direction that is perpendicular to the dispersion direction of said means for dispersing said interfered beam.

7. The apparatus of claim 6, wherein said spatial delay change across said beam measured in waves is less than the relative spectral resolution of said means for dispersing said interfered beam, which is the ratio of the wavelength divided by the blurring of the slit in the dispersion direction (l/•l).

8. The apparatus of claim 4, wherein said means for dispersing said interfered beam comprises a slit, wherein said spatial delay change across said beam measured in waves is at least the relative spectral resolution of said means for dispersing said interfered beam, which is the ratio of the wavelength divided by the blurring of said slit in the dispersion direction.

9. The apparatus of claim 6, wherein said spatial delay change across said beam occurs in discrete steps.

10. The apparatus of claim 4, wherein said means for interfering said electromagnetic radiation with a delayed copy of itself to produce an interfered beam comprises an interferometer, wherein said interferometer further comprises a stepped mirror, wherein said discrete steps are accomplished by said stepped mirror which defines a path length of said beam in said interferometer, wherein said interferometer further comprises a stepped etalon, wherein a stepped etalon may be used in conjuction with said stepped mirror.

11. The apparatus of claim 6, wherein said spatial delay change for all positions across said beam can be incremented versus time to produce an incremented delay change, wherein the average delay for a given exposure of said detector can be made different than said average delay for a later exposure, wherein an incremented delay change is optimally an even fraction of a wave such as one quarter wave or one third wave, wherein this is called phase stepping, wherein the total travel of a sequence of incremented phase changes is optimally an integer number of waves.

12. The apparatus of claim 6, wherein said spatial delay change, for all positions across said beam, can be incremented versus time, wherein an average delay for a given exposure of a detector can be made different than said average delay for a later exposure, wherein said increment is optimally an even fraction of a wave such as one quarter wave or one third wave, wherein this is called phase stepping, wherein the total travel of a sequence of said increments is optimally an integer number of waves.

13. The apparatus of claim 6, wherein said spatial delay change varies spatially less than half a wave across said beam, wherein said fringe is said to be taller than the beam and spatially unresolved, wherein said phase and said amplitude of said fringe for a given wavelength channel of said independent channels is determined using two or more phase stepping exposures and an assumed sinusoidal dependence of said fringe intensity with phase stepping phase.

14. The apparatus of claim 6, wherein said spatial delay change varies spatially by at least one half a wave across said beam, wherein said phase and said amplitude of said fringe for a given wavelength channel of said independent channels can be determined from its spatial variation across said beam for a single exposure.

15. The apparatus of claim 14, wherein additional phase stepping exposures improve the determination of fringe phase and amplitude for a given wavelength channel apart from common mode errors, by assuming said fringe phase varies sinusoidally with phase stepping phase and assuming common mode errors are stationary with respect to phase stepping phase.

16. The apparatus of claim 4, wherein said means for dispersing comprises a disperser having a spectral resolution, wherein said means for interfering comprises an interferometer having a spectral comb, wherein said spectral resolution of said disperser is sufficient to resolve said spectral comb of said interferometer, wherein said interferometer has a periodicity along the dispersion axis of $l^2/$(delay).

17. The apparatus of claim 4, wherein said means for dispersing comprises a disperser having a spectral resolution, wherein the spectral resolution of said disperser is insufficient to resolve the spectral comb of said interferometer, which has a periodicity along the dispersion axis of $l^2/$(delay).

18. The apparatus of claim 4, further including a spectral reference which is recorded together with a target beam so that said vector spectrum contains components of both target and reference.

19. The apparatus of claim 18, wherein said spectral reference is an absorption spectrum, such as provided by an iodine vapor cell.

20. The apparatus of claim 18, wherein said spectral reference has an emission spectrum.

21. The apparatus of claim 20, wherein said emission spectrum comprises a thorium lamp.

22. The apparatus of claim 4, further comprising at least one additional interferometers in series with said beam, wherein each interferometer of said at least one additional interferometers imprints additional components in said vector spectrum.

23. The apparatus of claim 4, wherein said means for interfering comprises an interferometer, wherein said interferometer is a Michelson interferometer, wherein an input beam is split into two paths which are interfered to produce an output.

24. The apparatus of claim 23, wherein said Michelson is a superimposing interferometer, wherein rays of said two paths superimpose in said output.

25. The apparatus of claim 4, wherein said means for interfering comprises an interferometer, wherein said interferometer is a Fabry-Perot interferometer, wherein an input beam enters into a recirculating path, which effectively interferes an infinite series of copies of said input beam having geometrically decreasing amplitudes.

26. The apparatus of claim 25, wherein Fabry-Perot comprises partially reflective mirrors having a reflectance that produces fringes that are approximately sinusoidal.

27. The apparatus of claim 26, wherein said fringes comprise a nonsinusoidal component, wherein said nonsinusoidal components of said fringes are discriminated against by sampling said fringes at four or less discrete places per period.

28. The apparatus of claim 4, wherein a dot product operation between said vector spectrum and an assumed component of said vector spectrum yields a rotational position and magnitude of an actual vector spectrum.

29. The apparatus of claim 28, wherein said dot product operation includes for each wavelength channel a dot product between spatial components of said vector spectrum and said vector component, to form a channelized dot product.

30. The apparatus of claim 29, wherein said dot product operation includes summing or averaging said channelized dot product over groups of wavelength channels to produce a generalized dot product.

31. The apparatus of claim 28, wherein said vector spectrum is expressed as a linear combination of assumed vector spectrum components, wherein rotation and magnitude of said vector spectrum components are solved for by applying dot products between linear combination and individual assumed vector spectrum components.

32. The apparatus of claim 4, wherein a Fourier transform operation applied to said vector spectrum produces an interferogram segment, wherein said interferogram segment can be shifted in delay-space by an amount equal to said interferometer delay to produce an adjusted interferogram segment, wherein said adjusted interferogram segment represents a measurement of a portion of a theoretical interferogram of the vector spectrum to invert the instrument behavior that generates Moire fringes in said vector spectrum from said input spectrum.

33. The apparatus of claim 32, wherein said adjusted interferogram segment can be concatenated with other interferogram segments which have different delay values to produce a concatenated interferogram, wherein said concatenated interferogram represents a measurement of a theoretical interferogram of said vector spectrum, wherein said concatenation process produces a more accurate representation of said theoretical interferogram.

34. The apparatus of claim 4, wherein said means for interfering comprises an interferometer, wherein said interferometer is formed by a long baseline interferometer, wherein light from a target is collected at two places separated by a baseline distance, wherein changes in angular position of said target relative to said baseline produce changes in arrival times between two said beams at a beamsplitter of said interferometer, wherein said changes in arrival time are equivalent to changes in the delay of said interferometer, wherein changes in angular position of a target can be inferred from corresponding changes in phase of said vector spectrum.

35. The apparatus of claim 34, wherein a multiplicative spectral reference is inserted into the optical path of said beam at a place where it imprints a spectrum of both said beams by the same said spectral reference, after said beamsplitter and at said separate collection places if two identical references are used.

36. The apparatus of claim 35, wherein said multiplicative spectral reference is an absorptive spectral reference, wherein said reference spectrum has many narrow spectral features having stable center wavelengths.

37. The apparatus of claim 36, wherein said absorptive spectral reference comprises an iodine vapor cell.

38. The apparatus of claim 4, wherein the illumination from additional targets collected passed through said interferometer along a common path with said beam produce a plurality of vector spectrums each containing several components corresponding to each said additional targets, wherein relative changes in phase of said components represent relative changes in angular position of targets, wherein this can be inferred independent of detailed knowledge of said optical path lengths between said collection ports which effect all said target light in common.

39. A method for measuring the spectral characteristics of a multifrequency source of electromagnetic radiation, comprising:

receiving a beam of electromagnetic radiation from said source; and producing a vector spectrum from said electromagnetic radiation.

40. The method of claim 39, wherein said step for producing a vector spectrum from said electromagnetic radiation comprises;

dispersing said electromagnetic radiation into individual channels organized by wavelength;

interfering said electromagnetic radiation with a delayed copy of itself to produce fringes; and for at least one individual channel, determining fringe phase and amplitude of the sinusoidal component of said fringes.

41. The method of claim 40, further comprising dithering the amount of delay between said electromagnetic radiation and said delayed copy by at least ½ of a wavelength to separate the sinusoidal variation due to fringes from the sinusoidal variation due to noise.

42. The method of claim 39, wherein the step for producing a vector spectrum comprises:

interfering said electromagnetic radiation with a delayed copy of itself to produce an interfered beam, wherein said interfered beam comprises fringes;

dispersing said interfered beam into independent channels organized by wavelength to create a fringing spectrum; and for at least one individual channel, determining the fringe phase and amplitude of the sinusoidal component of said fringing spectrum to produce a vector spectrum.

43. The method of claim 39, wherein the step of producing a vector spectrum comprises:

dispersing said electromagnetic radiation into independent channels organized by wavelength to create a fringing spectrum;

interfering said electromagnetic radiation with a delayed copy of itself to produce an interfered beam, wherein said interfered beam comprises fringes; and for at least one individual channel, determining the fringe phase and amplitude of the sinusoidal component of said fringing spectrum to produce a vector spectrum.

44. The method of claim 42, wherein said fringes comprise at least one half wave of spatial delay change that is spatially splayed across said interfered beam in a direction that is perpendicular to the dispersion direction of said means for dispersing said interfered beam.

45. The method of claim 44, wherein said spatial delay change across said beam measured in waves is less than the relative spectral resolution of said means for dispersing said interfered beam, which is the ratio of the wavelength divided by the blurring of the slit in the dispersion direction (l/•l).

46. The method of claim 44, wherein said means for dispersing said interfered beam comprises a slit, wherein said spatial delay change across said beam measured in waves is at least the relative spectral resolution of said means for dispersing said interfered beam, which is the ratio of the wavelength divided by the blurring of said slit in the dispersion direction.

47. The method of claim 44, wherein said spatial delay change across said beam occurs in discrete steps.

48. The method of claim 47, wherein the step of interfering said electromagnetic radiation with a delayed copy of itself to produce an interfered beam comprises an interferometer, wherein said interferometer further comprises a stepped mirror, wherein said discrete steps are accomplished by said stepped mirror which defines a path length of said beam in said interferometer, wherein said interferometer further comprises a stepped etalon, wherein a stepped etalon may be used in conjuction with said stepped mirror.

49. The method of claim 44, wherein said spatial delay change for all positions across said beam can be incremented versus time to produce an incremented delay change, wherein the average delay for a given exposure of said detector can be made different than said average delay for a later exposure, wherein an incremented delay change is optimally an even fraction of a wave such as one quarter wave or one third wave, wherein this is called phase stepping, wherein the total travel of a sequence of incremented phase changes is optimally an integer number of waves.

50. The method of claim 42, wherein said spatial delay change, for all positions across said beam, can be incremented versus time, wherein an average delay for a given exposure of a detector can be made different than said average delay for a later exposure, wherein said increment is optimally an even fraction of a wave such as one quarter wave or one third wave, wherein this is called phase stepping, wherein the total travel of a sequence of said increments is optimally an integer number of waves.

51. The method of claim 42, wherein said spatial delay change varies spatially less than half a wave across said beam, wherein said fringe is said to be taller than the beam and spatially unresolved, wherein said phase and said amplitude of said fringe for a given wavelength channel of said independent channels is determined using two or more phase stepping exposures and an assumed sinusoidal dependence of said fringe intensity with phase stepping phase.

52. The method of claim 42, wherein said spatial delay change varies spatially by at least one half a wave across said beam, wherein said phase and said amplitude of said fringe for a given wavelength channel of said independent channels can be determined from its spatial variation across said beam for a single exposure.

53. The method of claim 52, wherein additional phase stepping exposures improve the determination of fringe phase and amplitude for a given wavelength channel apart from common mode errors, by assuming said fringe phase varies sinusoidally with phase stepping phase and assuming common mode errors are stationary with respect to phase stepping phase.

54. The method of claim 42, wherein the step for dispersing comprises a disperser having a spectral resolution, wherein said means for interfering comprises an interferometer having a spectral comb, wherein said spectral resolution of said disperser is sufficient to resolve said spectral comb of said interferometer, wherein said interferometer has a periodicity along the dispersion axis of $l^2/(delay)$.

55. The method of claim 42, wherein the step for interfering comprises an interferometer having a spectral comb, wherein said vector spectrum is numerically blurred to diminish said spectral comb and enhance Moire fringes between said spectral comb and a target spectrum.

56. The method of claim 42, wherein the spectral resolution of said disperser is insufficient to resolve the spectral comb of said interferometer, which has a periodicity along the dispersion axis of $l^2/(delay)$.

57. The method of claim 42, wherein the sum bandwidth of said method is wide enough to allow fringes on separate wavelength channels that differ by at least 90 degrees.

58. The method of claim 42, further including a spectral reference which is recorded together with a target beam so that said vector spectrum contains components of both target and reference.

59. The method of claim 56, wherein said spectral reference is an absorption spectrum, such as provided by an iodine vapor cell.

60. The method of claim 56, wherein said spectral reference has an emission spectrum.

61. The method of claim 58, wherein said emission spectrum comprises a thorium lamp.

62. The method of claim 42, further comprising at least one additional interferometers in series with said beam, wherein each interferometer of said at least one additional interferometers imprints additional components in said vector spectrum.

63. The method of claim 42, wherein said step for interfering comprises an interferometer, wherein said interferometer is a Michelson interferometer, wherein an input beam is split into two paths which are interfered to produce an output.

64. The method of claim 63, wherein said Michelson is a superimposing interferometer, wherein rays of said two paths superimpose in said output.

65. The method of claim 42, wherein said means for interfering comprises an interferometer, wherein said interferometer is a Fabry-Perot interferometer, wherein an input beam enters into a recirculating path, which effectively interferes an infinite series of copies of said input beam having geometrically decreasing amplitudes.

66. The method of claim 65, wherein Fabry-Perot comprises partially reflective mirrors having a reflectance that produces fringes that are approximately sinusoidal.

67. The method of claim 66, wherein said fringes comprise a nonsinusoidal component, wherein said nonsinusoidal components of said fringes are discriminated against by sampling said fringes at four or less discrete places per period.

68. The method of claim 42, wherein a dot product operation between said vector spectrum and an assumed component of said vector spectrum yields a rotational position and magnitude of an actual vector spectrum.

69. The method of claim 68, wherein said dot product operation includes for each wavelength channel a dot product between spatial components of said vector spectrum and said vector component, to form a channelized dot product.

70. The method of claim 69, wherein said dot product operation includes summing or averaging said channelized dot product over groups of wavelength channels to produce a generalized dot product.

71. The method of claim 39, wherein said vector spectrum is expressed as a linear combination of assumed vector spectrum components, wherein rotation and magnitude of said vector spectrum components are solved for by applying dot products between linear combination and individual assumed vector spectrum components.

72. The method of claim 42, further comprising applying a Fourier transform operation to said vector spectrum to produce an interferogram segment, wherein said interferogram segment can be shifted in delay-space by an amount equal to said interferometer delay to produce an adjusted interferogram segment, wherein said adjusted interferogram segment represents a measurement of a portion of a theoretical interferogram of the vector spectrum to invert the instrument behavior that generates Moire fringes in said vector spectrum from said input spectrum.

73. The method of claim 72, wherein said adjusted interferogram segment can be concatenated with other interferogram segments which have different delay values to produce a concatenated interferogram, wherein said concatenated interferogram represents a measurement of a theoretical interferogram of said vector spectrum, wherein said concatenation process produces a more accurate representation of said theoretical interferogram.

74. The method of claim 42, wherein the step for interfering comprises an interferometer, wherein said interferometer is formed by a long baseline interferometer, wherein light from a target is collected at two places separated by a baseline distance, wherein changes in angular position of said target relative to said baseline produce changes in arrival times between two said beams at a beamsplitter of said interferometer, wherein said changes in arrival time are equivalent to changes in the delay of said interferometer, wherein changes in angular position of a target can be inferred from corresponding changes in phase of said vector spectrum.

75. The method of claim 42, wherein a multiplicative spectral reference is inserted into the optical path of said beam at a place where it imprints a spectrum of both said beams by the same said spectral reference, after said beamsplitter and at said separate collection places if two identical references are used.

76. The method of claim 75, wherein said multiplicative spectral reference is an absorptive spectral reference, wherein said reference spectrum has many narrow spectral features having stable center wavelengths.

77. The method of claim 76, wherein said absorptive spectral reference comprises an iodine vapor cell.

78. The method of claim 42, wherein the illumination from additional targets collected passed through said interferometer along a common path with said beam produce a plurality of vector spectrums each containing several components corresponding to each said additional targets, wherein relative changes in phase of said components represent relative changes in angular position of targets, wherein this can be inferred independent of detailed knowledge of said optical path lengths between said collection ports which effect all said target light in common.

79. The apparatus of claim 4, wherein said apparatus comprises a total bandwidth that is wide enough to allow fringes on separate wavelength channels that differ by at least 90 degrees.

80. The apparatus of claim 4, wherein said means for interfering comprises an interferometer having a spectral comb, wherein said vector spectrum is numerically blurred to diminish said spectral comb and enhance Moire fringes between said spectral comb and a target spectrum.

* * * * *